US011107217B2

(12) United States Patent
O'Rourke et al.

(10) Patent No.: US 11,107,217 B2
(45) Date of Patent: Aug. 31, 2021

(54) IN VIVO DETECTION OF EGFR MUTATION IN GLIOBLASTOMA VIA MRI SIGNATURE CONSISTENT WITH DEEP PERITUMORAL INFILTRATION

(71) Applicant: The Trustees of the University of Pennsylvania, Philadelphia, PA (US)

(72) Inventors: Donald O'Rourke, Wynnewood, PA (US); Spyridon Bakas, Philadelphia, PA (US); Christos Davatzikos, Philadelphia, PA (US)

(73) Assignee: The Trustees of the University of Pennsylvania, Philadelphia, PA (US)

( * ) Notice: Subject to any disclaimer, the term of this patent is extended or adjusted under 35 U.S.C. 154(b) by 926 days.

(21) Appl. No.: 15/493,722

(22) Filed: Apr. 21, 2017

(65) Prior Publication Data
US 2017/0309025 A1      Oct. 26, 2017

Related U.S. Application Data

(60) Provisional application No. 62/484,034, filed on Apr. 11, 2017, provisional application No. 62/325,764, filed on Apr. 21, 2016.

(51) Int. Cl.
*G06T 7/00* (2017.01)

(52) U.S. Cl.
CPC .......... *G06T 7/0014* (2013.01); *G06T 7/0012* (2013.01); *G06T 2207/10088* (2013.01); *G06T 2207/20076* (2013.01); *G06T 2207/20081* (2013.01); *G06T 2207/30016* (2013.01); *G06T 2207/30024* (2013.01); *G06T 2207/30096* (2013.01)

(58) Field of Classification Search
None
See application file for complete search history.

(56) References Cited

U.S. PATENT DOCUMENTS

| 8,532,353 | B2 | 9/2013 | Salazar-Ferrer |
| 2004/0218794 | A1 | 11/2004 | Kao |

FOREIGN PATENT DOCUMENTS

| WO | WO-2012/070951 | 5/2012 |
| WO | WO-2013/050331 | 4/2013 |
| WO | WO-2014/165753 | 10/2014 |

OTHER PUBLICATIONS

Chou YC, et al. Classification of hemodynamics from dynamic-susceptibility-contrast magnetic resonance (DSC-MR) brain images using noiseless independent factor analysis. Jun. 2007; 11(3):242-53. (published online Feb. 25, 2017).

Laviolette PS, et al. Effect of contrast leakage on the detection of abnormal brain tumor vasculature in high-grade glioma. J Neurooncol. Feb. 2014; 116(3):543-549. (published online Nov. 29, 2013).

Laviolette PS, et al. Vascular change measured with independent component analysis of dynamic susceptibility contrast MRI predicts bevacizumab response in high-grade glioma. Neuro Oncol. Apr. 2013; 15(4):442-50. (published online Feb. 3, 2013).

Rosen, BR. Perfusion Imaging with Nmr Contrast Agents. Magn Reson Med. May 1990; 14(2):249-65.

Tsolaki E, et al. Automated differentiation of glioblastomas from intracranial metastases using 3T MR spectroscopic and perfusion data. Int J Comput Assist Radiol Surg. Sep. 2013; 8(5):751-61. (published Jan. 19, 2013).

Akbari H, et al. Pattern analysis of dynamic susceptibility contrast-enhanced MR imaging demonstrates peritumoral tissue heterogeneity. Radiology. Nov. 2014; 273:502-10. (published online Jun. 19, 2014)

Aldape KD, et al, Immunohistochemical detection of EGFRvIII in high malignancy grade astrocytomas and evaluation of prognostic significance. J Neuropathol Exp Neurol. Jul. 1, 2004,63(7):700-7.

American Brain Tumor Association, Glioblastoma, Webpage www.abta.org/brain-tumor-information/types-of-tumors/glioblastoma.html.

Arevalo-Perez J, et al. T1-Weighted Dynamic Contrast-Enhanced MRI as a Noninvasive Biomarker of Epidermal Growth Factor Receptor vIII Status. AJNR Am J Neuroradiol. Dec. 2015;36(12):2256-61. (published online Sep. 3, 2015).

Arteaga C. Epidermal growth factor receptor dependence in human tumors: more than just expression? Oncologist. Aug. 2002;7 Suppl 4:31-9.

Avm DJ, et al. Molecular and cellular heterogeneity: the hallmark of glioblastoma. Neurosurg Focus. Dec. 2014;37(6):E11.

Bakas S, et al. [Abstract] NIMG-05: Identification of imagaing signatures of the Epidermal growth factor receptor variant III (EGFRvIII) in glioblastoma. Neuro-Oncology. Nov. 9, 2015; 17(suppl 5):v154.

Batmanghelich N, et al. Probabilistic Modeling of Imaging, Genetics and Diagnosis. IEEE Trans Med Imaging. Jul. 2016;35(7):1765-79. (published online Feb. 11, 2016).

Boockvar JA, et al. Constitutive EGFR signaling confers a motile phenotype to neural stem cells. Mol Cell Neurosci. Dec. 2003;24(4):1116-30. (published online Dec. 19, 2009).

Brennan CW, et al. The Somatic Genomic Landscape of Glioblastoma, Cell. Oct. 10, 2013;155(2):462-77.

Bullitt E, et al. Vessel tortuosity and brain tumor malignancy: a blinded study. Acad Radiol. Oct. 2005;12(10):1232-40.

(Continued)

*Primary Examiner* — John S Brusca
(74) *Attorney, Agent, or Firm* — Cathy A. Kodroff; Howson & Howson LLP

(57) ABSTRACT

A method, including a computer-implemented method, is provided for in vivo detection of epidermal growth factor receptor (EGFR) mutation status within peritumoral edematous tissue of a patient. The method includes performing quantitative pattern analysis of magnetic resonance imaging (MRI) data corresponding to MRI of in vivo peritumoral edematous tissue to determine a level of spatial heterogeneity or similarity within the in vivo peritumoral edematous tissue. EGFR mutation status is assigned as one of negative or positive based on the level of spatial heterogeneity or similarity determined. A non-transitory computer-readable storage medium and a system are also provided.

14 Claims, 12 Drawing Sheets
Specification includes a Sequence Listing.

(56) References Cited

OTHER PUBLICATIONS

Chang EL, et al. Evaluation of peritumoral edema in the delineation of radiotherapy clinical target volumes for glioblastoma. Int J Radiat Oncol Biol Phys. May 1, 2007; 68(1):144-50 (published online Feb. 15, 2007).

Daber R, et al. Understanding the limitations of next generation sequencing informatics, an approach to clinical pipeline validation using artificial data sets. Cancer Genet. Dec. 2013; 206(12):441-8. (published online Nov. 28, 2013).

De Coene B, et al. MR of the brain using fluid-attenuated inversion recovery (FLAIR) pulse sequences. American Journal of Neuroradiology. Nov.-Dec. 1992; 13(6):1555-1564.

Del Vecchio CA, et al. EGFRvIII gene rearrangement is an early event in glioblastoma tumorigenesis and expression defines a hierarchy modulated by epigenetic mechanisms. Oncogene. May 23, 2013; 32(21):2670-81. (published online Jul. 16, 2012).

Ellingson BM. Radiogenomics and imaging phenotypes in glioblastoma: novel observations and correlation with molecular characteristics. Curr Neurol Neurosci Rep. Jan. 2015; 15(1):506. (published online Nov. 20, 2014)

Fan QW, et al, EGFR Phosphorylates Tumor-Derived EGFRvIII Driving STAT3/5 and Progression in Glioblastoma. Cancer Cell. Oct. 14, 2013; 24(4):43849.

Gan H, et al. The epidermal growth factor receptor variant III(EGFRvIII): where the wild things are altered. FEBS Journal. Nov. 2013; 280(21):5350-70. (published online Jul. 8, 2013).

Gan HK, et al. The EGFRvIII variant in glioblastoma multiforme. Journal of Clinical Neuroscience. Jun. 2009; 16(6):748-54. (published online of Mar. 25, 2009).

Gaonkar B and Davatzikos C. Analytic estimation of statistical significance maps for support vector machine based multi-variate image analysis and classification. Neuroimage. Sep. 2013; 78:270-83. (published online Apr. 10, 2013).

Gedeon PC, et al. Rindopepimut: anti-EGFRvIII peptide vaccine, oncolytic. Drugs Future. Mar. 2013; 38(3):147-55.

Gevaert O, et al. Glioblastoma multiforme: exploratory radiogenotnic analysis by using quantitative image features. Radiology. Oct. 2014; 273(1):168-74. (published online May 12, 2014).

Gill BJ, et al. MRI-localized biopsies reveal subtype-specific differences in molecular and cellular composition at the margins ofglioblastoma. Proc Natl Acad Sci U S A. Aug. 26, 2014; 111(34):12550-5. (published online Aug. 11, 2014).

Gill S and June CH. Going viral: chimeric antigen receptor T-cell therapy for hematological malignancie. Immunol Rev. Jan. 2015; 263(10):68-89. (published online Dec. 15, 2014).

Hajnal JV, et al. Use of Fluid Attenuated Inversion Recovery (FLAIR) Pulse Sequences in MRI of the Brain. J Comput Assist Tomogr. Nov.-Dec. 1992; 16(6):841-844.

Heimberger AB, et al. Prognostic effect of epidermal growth factor receptor and EGFRvIII in glioblastoma multiforme patients. Clinical Cancer Research. Feb. 15, 2005; 11(4):1462-6.

Heimberger AB, et al. The natural history of EGFR and EGFRvIII in glioblastoma patients. Journal of Translational Medicine. Oct. 19, 2005; 3:38.

Hiemenz MC, et al. Building a Robust Tumor Profiling Program: Synergy between Next-Generation Sequencing and Targeted Single-Gene Testing. PLoS One. Apr. 4, 2016; 11(4):e0152851.

Humprey P, et al. Anti-synthetic peptide antibody reacting at the fusion junction of deletion-mutant epidermal growth factor receptors in human glioblastoma. Proc Natl Acad Sci USA. Jun. 1990; 87(11):4207-11.

Inda MM, et al. Tumor heterogeneity is an active process maintained by a mutant EGFR-induced cytokine circuit in glioblastoma. Genes & Development, Aug. 15, 2010; 24:1731-45.

Jain R, et al. Outcome Prediction in Patients with Glioblastoma by Using Imaging, Clinical, and Genomic Biomarkers: Focus on the Nonenhancing Component of the Tumor. Radiology. Aug. 2014; 272(2):484-93. (published online Mar. 19, 2014).

Jenkinson M, et al. FSL. NeuroImage. Aug. 15, 2012; 62(2):782-90. (published online Sep. 16, 2011).

Johnson BE, et al. Mutational Analysis Reveals the Origin and Therapy-Driven Evolution of Recurrent Glioma. Science. Jan. 10, 2014; 343(6167): 189-93. (published online Dec. 12, 2013).

Johnson DR and O'Neill BP. Glioblastoma survival in the United States before and during the temozolomide era. Journal of Neuro-Oncology. Apr. 2012; 107(2):359-64. (published online Nov. 2, 2011).

Kalman B, et al. Epidermal growth factor receptor as a therapeutic target in glioblastoma. Neuromolecular medicine. Jun. 2013; 15(2):420-34. (published online Apr. 11, 2013).

Kalos M, et al. T cells with chimeric antigen receptors have potent antitumor effects and can establish memory in patients with advanced leukemia. Science Translation Medicine. Aug. 10, 2011; 3(95): 95ra73.

Kerbel RS. Tumor angiogenesis: past, present and the near future. Carcinogenesis. Mar. 1, 2000; 21(3):505-15.

Krebs S, et al. Genetically modified T cells to target glioblastoma. Front Oncol. Dec. 31, 2012; 3:322. (published online Dec. 31, 2013).

Lal A, et al. Mutant epidermal growth factor receptor up-regulates molecular effectors of tumor invasion. Cancer Research. Jun. 15, 2002; 62(12):3335-9.

Lee JC, et al. Epidermal growth factor receptor activation in glioblastoma through novel missense mutations in the extracellular domain. Dec. 2006; 3(12):e485.

Lemasson B, et al. Assessment of multiparametric MRI in a human glioma model to monitor cytotoxic and anti-angiogenic drug effects. NMR Biomed. Jun. 2011; 24(5):473-82. (published online Dec. 8, 2010).

Lemee J-M, et al, Intratumoral heterogeneity in glioblastoma: don't forget the peritumoral brain zone. Neuro-Oncology. Oct. 2015; 17(10):1322-32. (published online Jul. 22, 2015)\.

NCT01454596 at ClinicalTrials.gov, CAR T Cell Receptor Immunotherapy Targeting EGFRvIII for Patients With Malignant Gliomas Expressing EGFRvIII (available at https://clinicaltrials.gov/ct2/show/NCT01454596) (first posted Oct. 19, 2011).

NCT01454596 at ClinicalTrials.gov, Phase III Study of Rindopepimut/GM-CSF in Patients with Newly Diagnosed Glioblastoma (ACT IV) (available at https://clinicaltrials.gov/ct2/show/NCT01480479) (first posted Nov. 29, 2011).

NCT01498328 at ClinicalTrials.gov, A Study of Rindopepimut/GM-CSF in Patients With Relapsed EGFRvIII-Positive Glioblastoma (ReACT) (available at https://clinicaltrials.gov/ct2/show/record/NCT01498328 ) (first posted Dec. 23, 2011).

NCT02209376 at ClinicalTrials.gov, Pilot Study of Autologous T Cells Redirected to EGFRVIII-With a Chimeric Antigen Receptor in Patients With EGFRvIII+ Glioblastoma (available at https://clinicaltrials.gov/ct2/show/NCT02209376) (first posted Aug. 5, 2014).

Niclou SP, Gauging heterogeneity in primary versus recurrent glioblastoma. Neuro-Oncology. Jul. 2015; 17(7):907-9, (published online May 12, 2015).

Nishikawa R, et al. A mutant epidermal growth factor human glioma confers enhanced tumorigenicity. Proc Natl Acad Sci in USA. Aug 2, 1994; 91(16):7727-31.

O'Rourke D, et al. [Abstract] IMCT-15: Pilot study of T cells redirected to EGFRvIII with a chimeric antigen receptor in patients with EGFRvIII+ glioblastoma. Neuro Oncol. Nov. 1, 2015; 17:v110-v111.

Patel AP, et al. Single-cell RNA-seq highlights intratumoral heterogeneity in primary glioblastoma. Science. Jun. 20, 2014; 344 (6160):1396-401. (published. online Jun. 12; 2014).

Pearson K. On Lines and Planes of closest fit to systems of points in space. Philosophical Magazine. 1901; 2(11):559-572.

Periturnoral Heterogeneity Index (PHI) Estimator. Center for Biomedical Image Computing and Analytics at Perelman School of Medicine University of Pennsylvania, available at http://www.med.upenn.edu/sbia/phiestimator.html.

Petrecca K, et al. Failure pattern following complete resection plus radiotherapy and temozolomide is at the resection margin in patients with glioblastoma. Journal of Neurooncology. Jan. 2013; 111(1):19-23. (published online Oct. 10, 2012).

(56) References Cited

OTHER PUBLICATIONS

Phillips HS; et al. Molecular subclasses of high-grade glioma predict prognosis, delineate a pattern of disease progression, and resemble stages in neurogenesis. Cancer Cell, Mar. 13, 2006; 9(3): 157-73.
Porter A. A dead end: a review of glioblastoma multiforme. Eukaryon. Mar. 2012; 8:64-68.
Redzic J, et al. Glioblastoma extracellular vesicles: reservoirs of potential biomarkers. Pharmgenomics Pers Med. Feb. 13, 2014; 7:65-77.
Salomon D, et al. Epidermal growth factor-related peptides and their receptors in human malignancies. Crit Rev Oncol Hematol. Jul. 1995; 19(3):183-232 . . . .
Sampson JH, et al. Immunologic escape after prolonged progression-free survival with epidermal growth factor receptor variant III peptide vaccination in patients with newly diagnosed glioblastoma. Journal of Clinical Oncology. Nov. 1, 2010; 28(31):4722-9. (published online Oct. 4, 2010).
Sampson JH, et al. Tumor-specific immunotherapy targeting the EGFRvIII mutation in patients with malignant glioma. Semin Immunol. Oct. 2008; 20(5):267-75. (published online Jun. 9, 2008).
Shinojima N, et al. Prognostic value of epidermal growth factor receptor in patients with glioblastoma multiforme. Cancer Research. Oct. 15, 2003; 63(20):6962-70.
Shlens J. "A Tutorial on Principal Component Analysis", available at arxiv.org/pdf/1404.1100v1.pdf (Apr. 7, 2014).
Sled J, et al. A nonparametric method for automatic correction of intensity nonuniformity in MRI data. IEEE Transactions on Medical Imaging. Feb. 1998; 17(1):87-97.
Smith SM and Brady JM. Susan—a new approach to low level image processing. International Journal of Computer Vision. May 1997; 23(1):45-78.
Sottoriva A, et al. Intratumor heterogeneity in human glioblastoma reflects cancer evolutionary dynamics. Proc Natl Acad Sci U S A. Mar. 5, 2013: 110:4009-14. (published online Feb. 14, 2013).
Thomas AA, et al. Emerging therapies for glioblastoma. Jama Neurol. Nov. 2014; 71(11):1437-44, (published online Sep. 22, 2014).
Tykocinski ES, et al. Use of magnetic perfusion-weighted imaging to determine epidermal growth factor receptor variant III expression in glioblastoma. Neuro-Oncology. May 2012; 14(5):613-23. (published online Apr. 4, 2012).
Van Den Bent MJ, et al. Changes in the EGFR amplification and EGFRvIII expression between paired primary and recurrent glioblastomas Neuro-Oncology. Jul. 2015; 17(7):935-41, (published online Feb. 16, 2015).
Veliz I, et al. Advances and challenges in the molecular biology and treatment of glioblastoma—is there any hope for the future? Ann Transl Med. Jan. 2015; 3(1):7.
Verhaak R, et al, Integrated Genomic Analysis Identifies Clinically Relevant Subtypes of Glioblastoma Characterized by Abnormalities in PDGFRA, IDH1, EGFR, and NF1 Cancer Cell. Jan. 19, 2010; 17(1):98-110.
Vivanco I, et al. Differential Sensitivity of Glioma-versus Lung Cancer-Specific EGFR Mutations to EGFR Kinase Inhibitors. Cancer Discov. May 2012; 2(5):458-71. (published online Mar. 31, 2012).
Yamahara T, et al. Morphological and flow cytometric analysis of cell infiltration in glioblastoma: a comparison of autopsy brain and neuroimaging. Brain Tumor Pathology. Oct. 2010; 27(2):81-7.

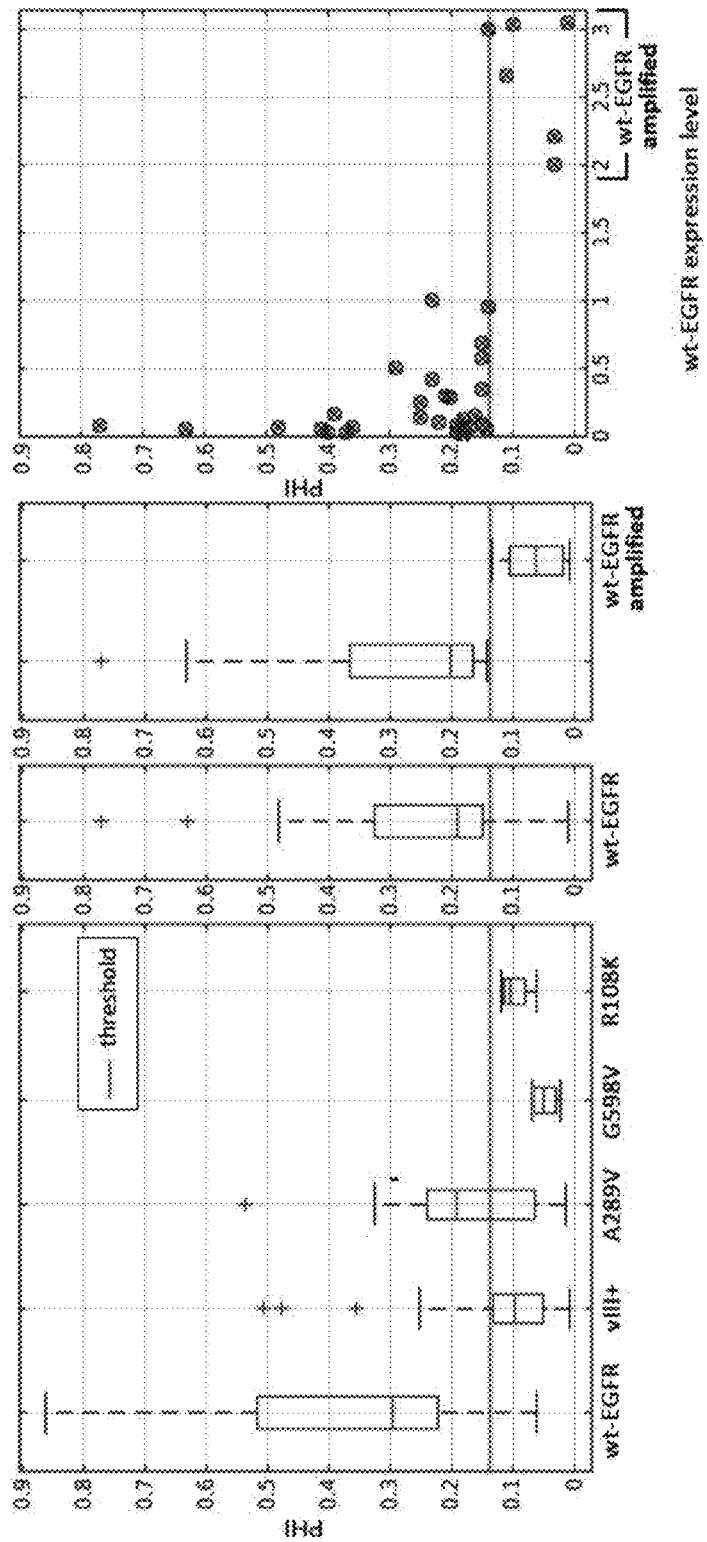

FIG 2A
FIG 2B
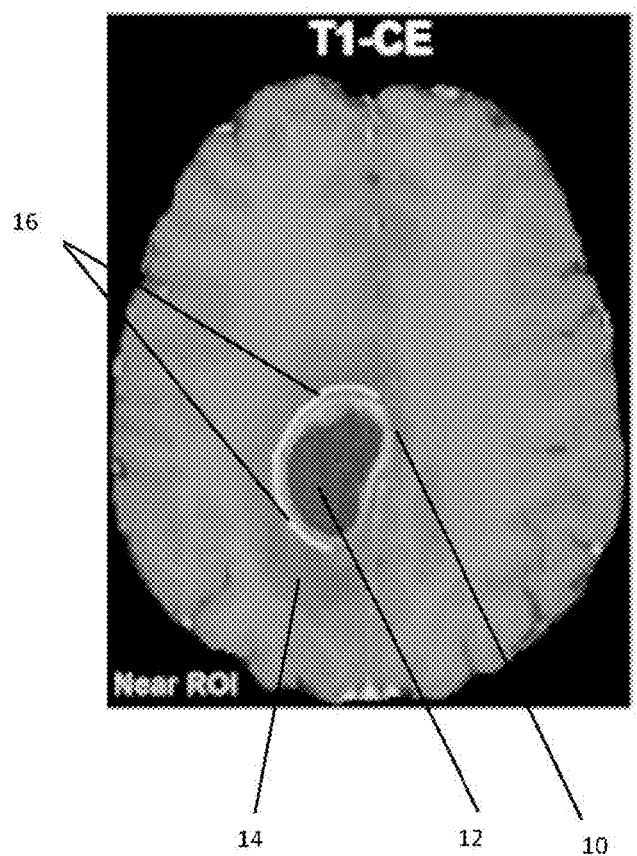
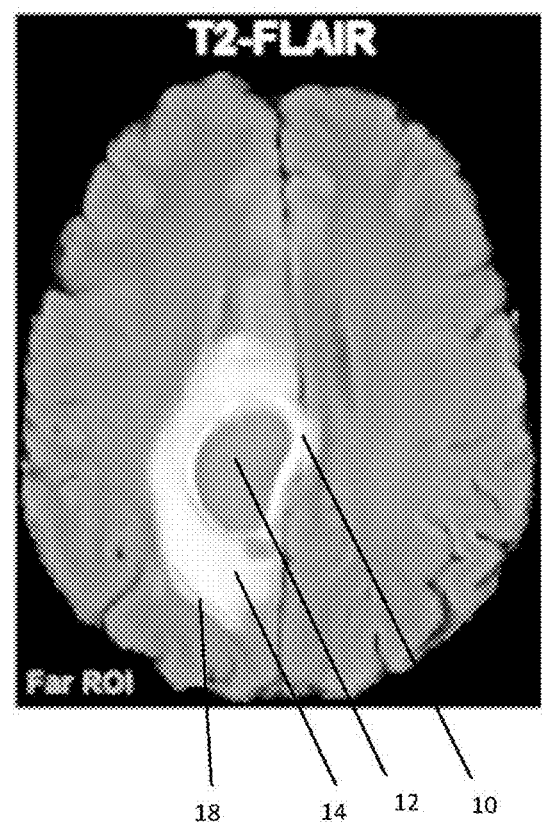

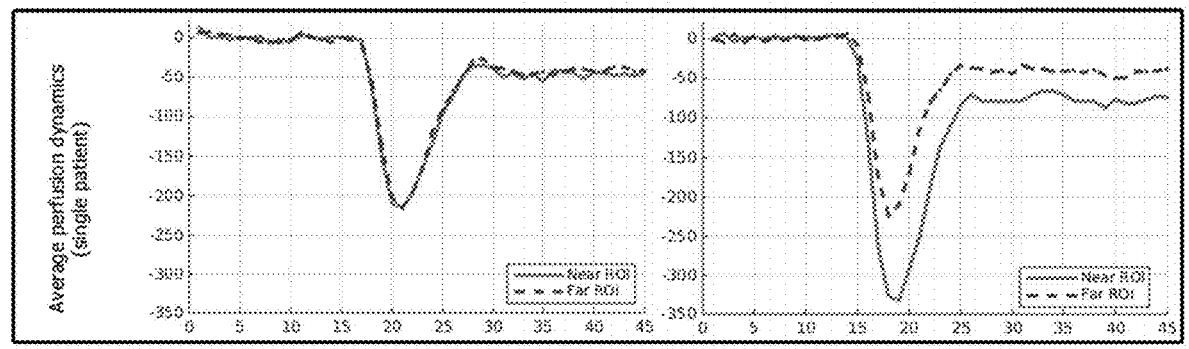
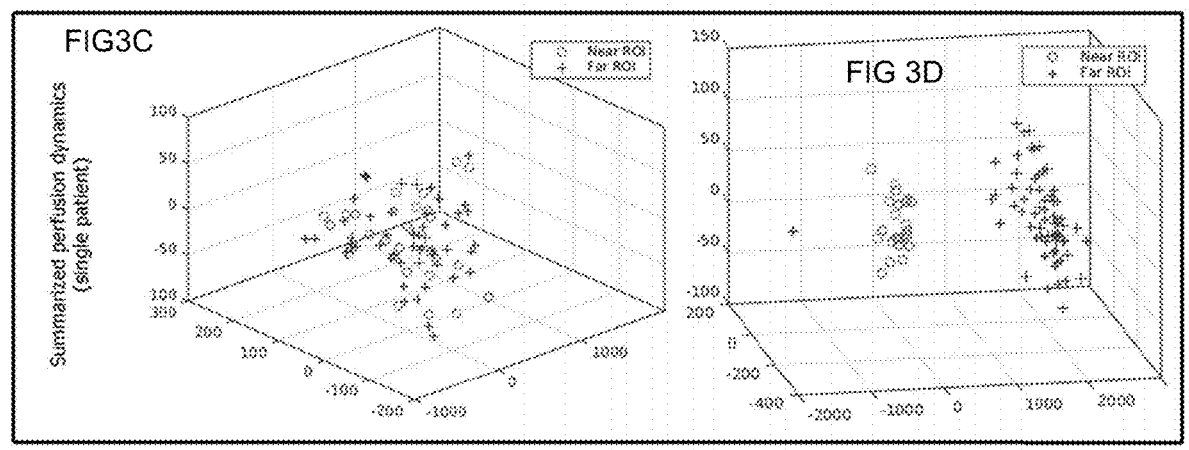
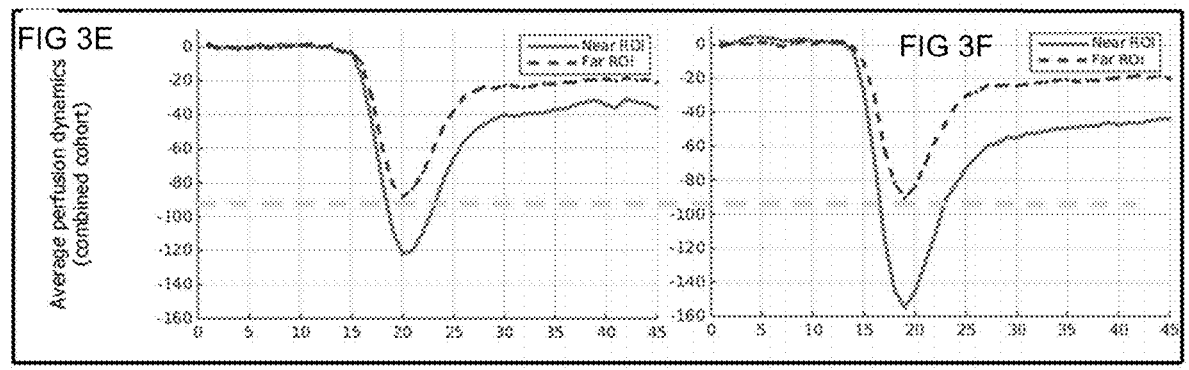

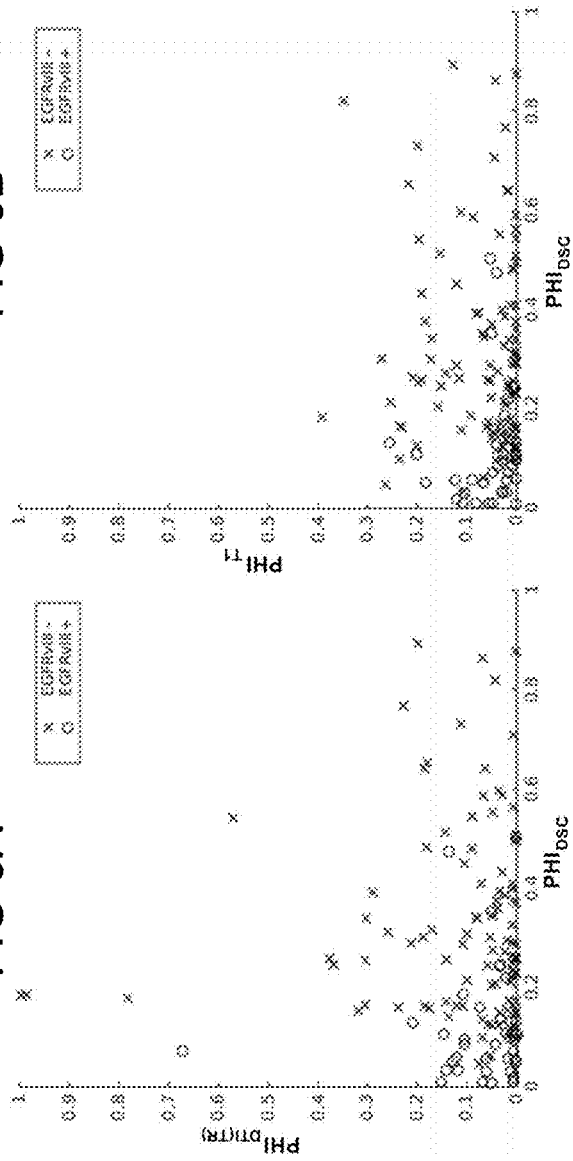

IN VIVO DETECTION OF EGFR MUTATION IN GLIOBLASTOMA VIA MRI SIGNATURE CONSISTENT WITH DEEP PERITUMORAL INFILTRATION

CROSS-REFERENCE TO RELATED APPLICATIONS

This application claims the benefit of U.S. Provisional Patent Application No. 62/484,034, filed Apr. 11, 2017 and U.S. Provisional Patent Application No. 62/325,764, filed Apr. 21, 2016, both of which are hereby incorporated in their entireties.

STATEMENT OF FEDERALLY SPONSORED RESEARCH

This invention was made with government support from grant R01-NS042645 awarded by the National Institutes of Health (NIH) and grant U24-CA189523 awarded by the NIH. The US government has certain rights in this invention.

BACKGROUND

Glioblastoma (GBM) is the most common and aggressive primary malignant adult tumor of the central nervous system. GBM may be located anywhere in the brain or spinal cord, but is typically found in the cerebral hemispheres of the brain. According to the American Brain Tumor Association, GBMs represent about 15.4% of all primary brain tumors and about 60-75% of all astrocytomas [American Brain Tumor Association, Glioblastoma, Webpage world wide web: abta.org/brain_tumor_information/types of tumors/glioblastoma.html, (2014), Last accessed: 04/01/2016].

GBMs have average survival of 14 months [D. Johnson, B. O'Neill, Glioblastoma survival in the United States before and during the temozolomide era. *Journal of Neuro-Oncology* 107, 359-364 (2011)] following standard treatment with surgical resection and chemo-radiation, and 4 months otherwise. Although these treatment options have improved over the years, there has not been any substantial improvement in the overall survival rates of GBM patients.

GBM is known to have highly heterogeneous expression of molecular characteristics. The effect of the above referenced treatment options has been hindered and confounded by the GBM heterogeneity, which is evident at the radiological, cellular and genetic level [J.-M. Lemee, et al, Intratumoral heterogeneity in glioblastoma: don't forget the peritumoral brain zone. Neuro-Oncology 17, 1322-1332 (2015)]. Determining the highly heterogeneous molecular characteristics in patients diagnosed with GBM is challenging, as conventional options are based on analysis of tissue, which is invasive and, most importantly, fails to capture the spatial heterogeneity of gene expression, as it is based on an analysis of a localized tissue sample.

The epidermal growth factor receptor (EGFR) is a regulator of normal cellular growth in tissues of epithelial origin [H. Gan et al., The epidermal growth factor receptor variant III (EGFRvIII): where the wild things are altered. *FEBS Journal* 280, 5350-5370 (2013)], and has been well-validated as a target for cancer therapy. Overexpression of the cell-surface EGFR leads to deregulation in its signaling, which is a main contributor to the formation of many epithelial malignancies in humans [P. Humphrey, et al, Anti-synthetic peptide antibody reacting at the fusion junction of deletion-mutant epidermal growth factor receptors in human glioblastoma. *Proc Natl Acad Sci USA* 87, 4207-4211 (1990); D. Salomon, et al., Epidermal growth factor-related peptides and their receptors in human malignancies. *Crit Rev Oncol Hematol* 19, 183-232 (1995)]. In such cases, which is the majority of patients with high-grade gliomas [A. B. Heimberger, et al., The natural history of EGFR and EGFRvIII in glioblastoma patients. *Journal of Translational Medicine* 3, (2005a)], there is typically an associated gene amplification [C. Arteaga, Epidermal growth factor receptor dependence in human tumors: more than just expression? *Oncologist* 7, 31-39 (2002)] or mutation [R. Nishikawa, et al, A mutant epidermal growth factor receptor common in human glioma confers enhanced tumorigenicity. *Proc Natl Acad Sci USA* 91, 7727-7731 (1994)] in EGFR [C. W. Brennan, et al, The Somatic Genomic Landscape of Glioblastoma. *Cell* 155, 462-477 (2013).]. Furthermore, mutations in EGFR have been identified as primarily occurring in one particular molecular subtype of GBM, namely classical [H. S. Phillips, et al. Molecular subclasses of high-grade glioma predict prognosis, delineate a pattern of disease progression, and resemble stages in neurogenesis. *Cancer Cell* 9, 157-173 (2006)], and corresponding "abnormalities" in EGFR expression have been associated with poorer survival and reduced response to aggressive therapy [R. Verhaak, et al, Integrated Genomic Analysis Identifies Clinically Relevant Subtypes of Glioblastoma Characterized by Abnormalities in PDGFRA, IDH1, EGFR, and NFL *Cancer Cell* 17, 98-110 (2010)]. The most common extracellular EGFR mutation is the variant III (EGFRvIII), which is an important factor in driving tumor progression and defining prognosis in GBM patients [N. Shinojima, et al, Prognostic value of epidermal growth factor receptor in patients with glioblastoma multiforme. *Cancer Research* 63, 6962-6970 (2003); K. D. Aldape, et al, Immunohistochemical detection of EGFRvIII in high malignancy grade astrocytomas and evaluation of prognostic significance. *Journal of Neuropathology and Experimental Neurology* 63, 700-707 (2004); A. B. Heimberger, et al, Prognostic effect of epidermal growth factor receptor and EGFRvIII in glioblastoma multiforme patients. *Clinical Cancer Research* 11, 1462-1466 (2005b)]. Half of EGFR-amplified tumors harbor the EGFRvIII mutation, which is a gene rearrangement due to in-frame deletion of exons 2-7 from this receptor tyrosine kinase [H. K. Gan, et al. The EGFRvIII variant in glioblastoma multiforme. *Journal of Clinical Neuroscience* 16, 748-754 (2009)]. This deletion consequently causes constitutive signaling in the absence of ligand binding [Q.-W. Fan, et al., EGFR Phosphorylates Tumor-Derived EGFRvIII Driving STAT3/5 and Progression in Glioblastoma. *Cancer Cell* 24, 438-449 (2013]. In contrast to EGFR, which can be found in normal tissue, EGFRvIII is expressed only in cancerous tissue [J. H. Sampson, et al., Tumor-specific immunotherapy targeting the EGFRvIII mutation in patients with malignant glioma. *Semin Immunol* 20, 267-275 (2008)], can be found nearly in 33% of GBM patients [Shinojima, cited above; Aldape, cited above; Heimberger, cited above] and its overexpression worsens the prognosis [Shinojima, cited above; Heimberger, 2005a, cited above; Heimberger, 2005b, cited above]. Specifically, patients harboring the mutation (EGFRvIII-positive) have shown significantly shorter median OS [J. H. Sampson, et al., *Journal of Clinical Oncology* 28, 4722-4729 (2010)]. EGFRvIII is also associated with activation of numerous oncogenic processes leading to aggressive tumor growth and proliferation [Nishikawa, cited above; M.-d.-M. Inda, et al, Tumor heterogeneity is an active process maintained by a mutant EGFR-induced cytokine circuit in glioblastoma. *Genes & Development* 24, 1731-1745 (2010); A.

Porter, A dead end: a review of glioblastoma multiforme. *Eukaryon* 8, 64-68 (2012)], hence evidence of the mutant's presence can have a very high impact on treatment decisions, as well as on evaluating treatment response. For these reasons, vaccination against EGFRvIII is a potentially promising immunotherapy [J. H. Sampson, et al., Tumor-specific immunotherapy targeting the EGFRvIII mutation in patients with malignant glioma. *Semin Immunol* 20, 267-275 (2008); J. H. Sampson, et al. Immunologic escape after prolonged progression-free survival with epidermal growth factor receptor variant III peptide vaccination in patients with newly diagnosed glioblastoma. *Journal of Clinical Oncology* 28, 4722-4729 (2010)], and EGFRvIII represents a potentially viable therapeutic target for GBM patients [B. Kalman, et al., Epidermal growth factor receptor as a therapeutic target in glioblastoma. *Neuromolecular medicine* 15, 420-434 (2013); I. Veliz, et al., *Ann Trans Med* 3, 7 (2015)] that has been the target of several investigational drug trials and pilot studies [D. O'Rourke, S. Chang, Pilot Study of Autologous T Cells Redirected to EGFRVIII− With a Chimeric Antigen Receptor in Patients With EGFRVIII+ Glioblastoma (ClinicalTrials.gov Identifier: NCT02209376) (2014); D. O'Rourke, et al., *Neuro Oncol* 17, v110-v111 (2015); Celldex, A Study of Rindopepimut/GM-CSF in Patients With Relapsed EGFRvIII-Positive Glioblastoma (ReACT) (ClinicalTrials.gov Identifier: NCT01498328). (2011); Celldex, Phase III Study of Rindopepimut/GM-CSF in Patients With Newly Diagnosed Glioblastoma (ACT IV) (ClinicalTrials.gov Identifier: NCT01480479). (2011)].

Although determination of EGFRvIII status is vital for targeted therapeutics in GBM, invasive studies are required for current tissue-based approaches, which include immunohistochemistry and next generation sequencing. The process of such approaches is hindered by the spatial [A. Sottoriva, et al. Intratumor heterogeneity in human glioblastoma reflects cancer evolutionary dynamics. *Proc Natl Acad Sci USA* 110, 4009-4014 (2013); A. P. Patel, et al. Single-cell RNA-seq highlights intratumoral heterogeneity in primary glioblastoma. *Science* 344, 1396-1401 (2014)] and temporal heterogeneity [P. C. Gedeon, et al. Rindopepimut: anti-EGFRvIII peptide vaccine, oncolytic. *Drugs Future* 38, 147-155 (2013); M. J. v. d. Bent, et al. Changes in the EGFR amplification and EGFRvIII expression between paired primary and recurrent glioblastomas *Neuro-Oncology* 17, 935-941 (2015); S. P. Niclou, Gauging heterogeneity in primary versus recurrent glioblastoma. *Neuro-Oncology* 17, 907-909 (2015)] of molecular alterations within the GBM tumor that give rise to sampling error (i.e., analysis of single tissue specimen is not sufficient for determining the dominant mutant expression). Furthermore, the invasive nature of repeated biopsies makes it nearly impossible to evaluate the dynamic equilibrium of mutations and molecular characteristics that occur during the course of treatment, hence adapt the treatment accordingly. Patient stratification and selection for treatment is limited for the same reason. In other cases, the biopsy (or resection) of the tumor might not always be possible, such as in cases of deep-seated tumors, in which there is no sufficient sample size for histopathological analysis. Finally, molecular testing may be unavailable in certain clinical settings due to cost or equipment availability.

Thus, accurate, reproducible, non-invasive methods for diagnosis of cancers associated with EGFRvIII mutations are needed.

SUMMARY OF THE INVENTION

In one aspect, a computer-implemented method for in vivo detection of epidermal growth factor receptor EGFR mutation status is provided, utilizing Magnetic Resonance Imaging (MRI) signals within peritumoral edematous tissue. Such mutations may include tumors (e.g., glioblastoma) overexpressing the wild-type EGFR (mutational activation), and/or tumors harboring EGFR splice variant III (EGFRvIII+), and/or tumors harboring point mutations such as A289V, G598V, or R108K. The computer-implemented method includes, executing on a processor, the step of performing quantitative pattern analysis of MRI data to determine a level of spatial heterogeneity or similarity within the in vivo peritumoral edematous tissue and the step of assigning EGFR mutation status as one of negative or positive (EGFRvIII+ or EGFRVIII−, EGFR A298V+/−; EGFR G598V+/−, or EGFR R108K+/−_) based on the level of spatial heterogeneity or similarity determined.

In another aspect, a method of in vivo detection of EGFR mutation status within the peritumoral edematous tissue of a patient is provided. This method includes; a) acquisition of MRI data corresponding to in vivo peritumoral edematous tissue of a patient, b) identification of separate, non-overlapping first and second regions of interest (ROIs) within the peritumoral edematous tissue, c) analysis of the MRI data corresponding to the separate first and second ROIs to determine a level of heterogeneity or similarity therebetween, and d) assigning EGFR mutation status as one of negative or positive based on the level of heterogeneity or similarity determined.

In a further aspect, the methods and systems described herein are useful in monitoring the progress of a patient following initiation of treatment (e.g., post-dosing with a specific EGFR-targeted or a non-targeted therapy. The system allows detection of one or more of: reduced tumor size, reduced peritumoral edematous tissue, and/or reduced presence of tissue having an EGFR mutation. In certain embodiments, one or more of these may be observed in the absence of any change in another.

In a further aspect, a non-transitory computer-readable storage medium is provided and includes stored instructions which, when executed by one or more computer processors, cause the one or more computer processors to perform quantitative pattern analysis of MRI data corresponding to the peritumoral edematous tissue, in order to determine a level of spatial heterogeneity or similarity within the peritumoral edematous tissue, and to assign EGFR mutation status as one of negative or positive based on the level of spatial heterogeneity or similarity determined.

In yet a further aspect, a system for in vivo detection of EGFR mutation status within the peritumoral edematous tissue of a patient is provided. The system includes at least one processor configured to perform quantitative pattern analysis of MRI data corresponding to MRI of in vivo peritumoral edematous tissue to determine a level of spatial heterogeneity or similarity within the peritumoral edematous tissue. The at least one processor is being configured to assign EGFR mutation status as one of negative or positive, based on the level of spatial heterogeneity or similarity determined.

BRIEF DESCRIPTION OF THE DRAWINGS

Various features of the embodiments described in the following detailed description can be more fully appreciated when considered with reference to the accompanying figures, wherein the same numbers refer to the same elements.

FIGS. 1A-1D show distributions of the Peritumoral Heterogeneity Index (PHI, or φ-index) for various alterations in the Epidermal Growth Factor Receptor (EGFR), as measured in baseline pre-operative scans of de novo glioblastoma. In FIG. 1A, values for the wild-type EGFR (wt-EGFR, i.e., "the controls") are much higher than the values obtained for various EGFR alterations, including tumors harboring the splice variant III (vIII+), as well as those harboring various point mutations (i.e., A289V, G598V, R108K). In FIG. 1B shows another wt-EGFR cohort identified, independent from the one shown in FIG. 1A, with quantitative expression levels available. FIG. 1C shows the clear distinction, based on PHI, between highly-expressed wt-EGFR (high-expr) and those with lower expression. FIG. 1D shows a scatter plot of all samples included in FIG. 1C, pinpointing the relation between the wt-EGFR expression level and the obtained PHI (Corr=−0.48, p=0.0047).

FIGS. 2A and 2B are examples of immediate and distant peritumoral region of interest (ROI) annotations. FIG. 2A illustrates a near ROI (16) defined adjacent to the enhancing part (12) of the tumor (10) superimposed on a T1-CE axial image, and FIG. 2B illustrates a far ROI (18) defined in the periphery of the tumor (10) within edema (14) superimposed on a T2-FLAIR axial image. These ROIs are described by lines annotated in multiple slices for each subject and not just in a single slice, as shown in this visual example.

FIGS. 3A-3F show the temporal perfusion dynamics for the described immediate and distant peritumoral regions of interest (ROIs), by EGFRvIII expression status. FIGS. 3A and 3B illustrate examples of aligned average perfusion curves for individual patients. FIGS. 3C and 3D show the summarization of perfusion curves through principal component analysis in three components. Note that each perfusion curve in FIG. 3A and FIG. 3B is represented by a single dot in FIG. 3C and FIG. 3D. These summarized perfusion curves show more separability (higher φ-index) between the immediate and the distant peritumoral ROI measures among EGFRvIII− patients compared to EGFRvIII+ patients. FIGS. 3E and 3F illustrate aligned average perfusion curves across 142 patients. Note that the drop in the perfusion signal for the distant peritumoral ROI is almost identical between across all patients, and that the average drop in the immediate peritumoral ROI is much deeper among the EGFRvIII− patients compared to EGFRvIII+ patients.

FIGS. 5A-5I provide ROC curves for individual MRI modalities across 140 patients. FIGS. 5J-5K provide ROC curves for combination of modalities across 140 patients. FIG. 5I provides ROC curves for a desirable embodiment of the invention in 142 patients.

FIGS. 6A-6B are scatter plots of the Peritumoral Heterogeneity Index (PHI), by EGFRvIII expression status across 140 patients, in the DSC modality (x axis) over the PHI in the DTI-TR measure (y axis) in FIG. 6A and over the PHI in the T1 modality (y axis) in FIG. 6B.

FIG. 10A provides the EGFRvIII+ subgroup. FIG. 10B provides the EGFRvIII− subgroup. Although these rCBV results are consistent with those obtained via PHI, the separation between EGFRvIII+ and EGFRvIII− is notably weaker.

DETAILED DESCRIPTION OF THE INVENTION

Figure 4A:
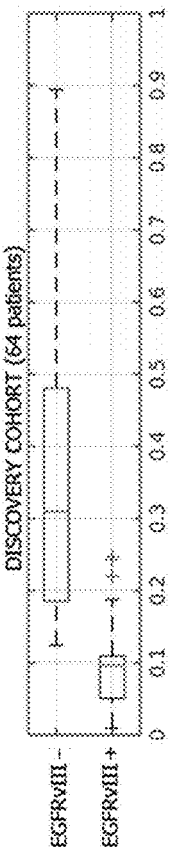
FIGS. 4A-4C show distributions of the Peritumoral Heterogeneity Index (PHI) by EGFRvIII expression status across the discovery cohort in FIG. 4A, the replication cohort in FIG. 4B, and the combined cohort in FIG. 4C. Statistical significance was evaluated via a two-tailed paired t-test comparing between the two distributions of: the discovery cohort (p=1.5725×10−7) (FIG. 4A), the replication cohort (p=2.8164×10−4) (FIG. 4B), and the combined cohort (p=4.0033×10−10) (FIG. 4C). The bottom and top of each "box" depict the 1st and 3rd quartile of the PHI measure, respectively. The line within each box indicates the median, and the fact that it is not necessarily at the center of each box indicates the skewness of the distribution over different cases. The "whiskers" drawn external to each box depict the extremal observations still within 1.5 times the interquartile range, below the 1st or above the 3rd quartile. Observations beyond the whiskers are marked as outliers with a "+" sign.

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

As used herein, the term "glioma" refers to a type of tumor that occurs in the brain and spinal cord. Gliomas begin in the gluey supportive cells (glial cells) that surround nerve cells and help them function.

As used herein, the term "Glioblastoma (GBM)" refers to the most common and aggressive primary malignant adult tumor of the central nervous system. Glioblastoma may be located anywhere in the brain or spinal cord, but is typically found in the cerebral hemispheres of the brain.

As used herein, the term "Epidermal Growth Factor (EGF)" refers to a tyrosine protein kinase whose receptor over-expression is one of the hallmarks of glioblastoma, present in 50-60% of tumors [A. B. Heimberger, et al. The natural history of EGFR and EGFRvIII in glioblastoma patients, *Journal of Translational Medicine* 3, (2005)]. As used herein, the term "Epidermal Growth Factor Receptor (EGFR)" refers to a protein found on the surface of cells to which epidermal growth factor (EGF) binds. EGFR is a regulator of normal cellular growth in tissues of epithelial origin. The sequence of human EGFR is available, e.g., uniprot.org/uniprot/P00533.

As used herein, the term "Epidermal Growth Factor Receptor mutant" refers to any of the EGFR mutations which is associated with a disease or disorder. Amplification of wtEGFR may be observed in addition to one or more of mutations. In certain embodiments, wtEGFR amplification is observed in the absence of mutations. Examples of human EGFR mutants include EGFR A298 mutants (including changes from the Ala at position 298 to one of V (A298V+/−), D (A298D+/−), T (A298T+/−), N (A298N+/−), or I (A298I+/−); EGFR G598V+/−, or EGFR R108 (including changes from the Arg at position 108 to K (R108K+/−) or R108G+/−. In one embodiment, the EGFR mutant is variant III (EGFRvIII)", alternatively named de2-7EGFR or ΔEGFR, refers to the most common extracellular EGFR mutation, which lacks the extracellular ligand binding domain of exons 2-7. See, e.g., H K Gan et al, FEBS J, 2013 November; 280(2):5350-60. EGFRvIII is an important factor in driving tumor progression and in defining prognosis in cancer patients, and therefore, provides a potential therapeutic target. This EGFRvIII mutation has been described as being present in GBM (a brain cancer). However, the EGFRvIII is also present in other cancers, for which the techniques and apparatus described herein are also useful. Such cancers may include, e.g., EGFRvIII-associated metastatic prostate cancer, breast cancer, anaplastic astrocytoma, lung cancers (non-small cell lung cancer, predominantly squamous cell type), adenocarcinomas, head/neck cancers, thyroid cancers, bladder cancer, ovarian cancer, and colorectal cancer. Other EGFR-mutants and their associated conditions are known to those of skill in the art. See, e.g., uniprot.org/uniprot/P00533. This sequence is reproduced in SEQ ID NO: 1 for convenience. The residue numbers of the mutations described herein is provided with reference to the numbering of this sequence, which includes the signal peptide. In certain embodiments, a patient may have a neoplasm associated with combinations of one or more of these mutants.

As used herein, the term "resection" refers to tumor tissue removal via surgery.

As used herein, the term "edema" refers to swelling of a selected tissue, e.g., in brain tissue a common result of having a brain tumor. The term "peritumoral edema" refers to edema occurring around a tumor, typically depicted by high signal intensity in T2-weighted fluid-attenuated inversion recovery (T2-FLAIR) MRI.

As used herein, the term "spatial heterogeneity", or else the spatial gradient as one moves away from the tumor, refers to an uneven distribution or variability of a characteristic across peritumoral edematous tissue, and is measured by the Bhattacharyya distance between the signals in a near-tumor regions of interest (ROI) and the signals in a far-from-the-tumor edematous ROI.

As used herein, the term "perfusion" refers to the steady-state delivery of blood to a capillary bed in its biological tissue. Perfusion is variably used for different physiologic parameters that also affect the imaging (e.g., magnetic resonance) signal, e.g., blood volume, blood velocity, and blood oxygenation.

As used herein, the term "neovascularization" refers to the formation of functional microvascular networks with red blood cell perfusion.

As used herein, the term "Magnetic Resonance Imaging (MRI)" refers to a medical imaging technology using radio waves and a magnetic field to create detailed images of organs and tissues, such as brain tissue. The working examples herein illustrate use of dynamic susceptibility contract (DSC) MRI perfusion images. However, the invention is not so limited, and Dynamic Contrast Enhanced (DCE) MRI perfusion images could also be considered. Furthermore, signal from other MRI modalities could also be added (or in place of the perfusion images), such as T1-weighted (pre- and post-contrast), T2-weighted (pre- and post-contrast). Although the examples use the 3-Tesla Siemens Magentom Tria A Tim clinical MRI system using our standard clinical protocol and settings (Erlangen, Germany), it will be readily understood that by one of skill in the art that the process and apparatus described herein are not limited to this equipment, settings, sequences, or imaging. For example, a variety of suitable imaging systems are commercially available, e.g., from Siemens, GE, Philips, Hitachi or Toshiba. The apparatus provided herein may be integrated with the imaging apparatus, or separate from, and operably linked so that the data from the imaging apparatus is transmitted electronically to apparatus described herein. Alternatively, the processor(s) described herein are not directly operably linked to receive the data output of the imaging system, but is a stand-alone system to which the data are delivered by separate means. The manner in which the starting data are delivered to a processor as described herein, is not a limit on the present invention.

The term "ROI" or "region of interest" refers to a selected subset of samples within a data set identified for a specific purpose, e.g., the boundaries of a tumor as defined on an image or in a volume, for the purpose of measuring its size/volume.

The term "voxel" refers to each of an array of elements of volume that constitute a notional three-dimensional space, as customary in any imaging modality.

As used herein, the term "processor" refers to a functional unit that interprets and executes instruction data. Such a functional unit may be, e.g., a computer, a diffusion data apparatus, a hand-held device or other apparatus or equipment.

As described herein, computer software may be operably linked to a processor or other apparatus.

As used herein, the term "Dynamic Susceptibility Contrast (DSC)-MRI" refers to an MRI capable of assessing cerebral microvasculature. In DSC-MRI perfusion imaging, a contrast agent is injected into the blood and monitored as it passes through the microvasculature.

As used herein, T1 refers to the time constant (usually reported in milliseconds, msec) during the T1 relaxation. Relaxation means restoration of the equilibrium state or going back to a low-energy level after excitation. T1 relaxation is the process by which the longitudinal magnetization is recovered (after the excitation pulse is applied) due to transfer of energy from the nuclear spin system to the neighboring molecules (the lattice). It occurs in the z-direction (z-axis is often depicted as a vertical line). The T1 relaxation time is a measure of the rate of transfer of energy from the nuclear spin system to the neighboring molecules (the lattice). It is the time when 63% of the longitudinal magnetization has recovered.

The term "T1 weighted image" refers to one of the basic pulse sequences in MRI and demonstrates differences in the T1 relaxation times of tissues. T1-weighted imaging is used to differentiate anatomical structures mainly on the basis of T1 values; i.e. the scanning parameters are set (short repetition time (TR)/short echo time (TE)). Tissues with high fat content (e.g. white matter) appear bright and compartments filled with water (e.g. CSF) appears dark.

As used herein, T2 relaxation is the process by which the transverse magnetization decays due to dephasing of proton spins (spins becoming desynchronized). After the excitation pulse is applied, the magnetization flips 90 degrees from the longitudinal axis to the xy-plane. The transverse magnetization is initially maximum (due to coherent nuclear spins) but this arrangement is gradually lost due to field inhomogeneities and/or direct interactions between the spins (without energy transfer to the lattice). T2 relaxation occurs on the xy-plane and is often depicted as the spreading of magnetic moments along the plane. The T2 relaxation time is a measure of the rate of the decay of transverse magnetization within the xy-plane. It is the time when 63% of the transverse magnetization has decayed. The term "T2-FLAIR" refers to a T2 weighted fluid-attenuated inversion recovery magnetic resonance image. See, e.g., De Coene B, et al. *American Journal of Neuroradiology*, 13(6):1555-1564 (1992); and Hajnal J V, et al. J Comput Assist Tomogr 1992; 16:841-844.

Other weighting techniques, such as diffusion-weighting and perfusion weighting are also known in the art.

As used herein, the term "Principal Component Analysis (PCA)" is a mathematical and statistical procedure that transforms a number of possibly correlated variables into a smaller number of uncorrelated variables called principal components. See [H. Hotelling, Analysis of a complex of statistical variables into principal components, *Journal of Educational Psychology*, 24(6):417-441 (1933); K. Pearson, On Lines and Planes of closest fit to systems of points in space, Philosophical Magazine, 2(11):559-572 (1901)] See, e.g., Jolliffe I. T. Principal Component Analysis, Series: Springer Series in Statistics, 2nd ed., Springer, N Y, 2002, XXIX, 487 p. 28 illus. ISBN 978-0-387-95442-4. See, also, J. Schlens, "A Tutorial on Principal Component Analysis", arxiv.org/pdf/1404.1100v1.pdf (Apr. 7, 2014).

As used herein, the term "Bhattacharyya Coefficient" is a statistical measure of the amount of overlap between two statistical samples or populations. See, e.g., A. Bhattacharyya, Bulletin of the Calcutta Mathematical Society, 35: 99-109 (1943).

As used herein, the terms "Peritumoral Heterogeneity Index (PHI)" or "φ-index" are used to refer to a measure of the separability between summarized perfusion measurements of two ROIs.

It is to be noted that the term "a" or "an" refers to one or more. As such, the terms "a" (or "an"), "one or more," and "at least one" are used interchangeably herein.

The words "comprise", "comprises", and "comprising" are to be interpreted inclusively rather than exclusively. The words "consist", "consisting", and its variants, are to be interpreted exclusively, rather than inclusively. While various embodiments in the specification are presented using "comprising" language, under other circumstances, a related embodiment is also intended to be interpreted and described using "consisting of" or "consisting essentially of" language.

As used herein, the term "about" means a variability of 10% from the reference given, unless otherwise specified.

A "patient" is a mammal, e.g., a human, mouse, rat, guinea pig, dog, cat, horse, cow, pig, or non-human primate, such as a monkey, chimpanzee, baboon or gorilla. In one embodiment, the patient is a human.

Unless defined otherwise in this specification, technical and scientific terms used herein have the same meaning as commonly understood by one of ordinary skill in the art and by reference to published texts, which provide one skilled in the art with a general guide to many of the terms used in the present application.

Embodiments

Embodiments disclosed herein use EGFR mutants as a target for cancer therapy. For instance, EGFR events can be identified to drive one particular molecular subtype of GBM, namely classical GBM, and corresponding "abnormalities" in the EGFR expression may be associated with predicting survival rate and with directing response and treatment toward aggressive therapies.

Conventionally, EGFR mutant status is determined based on invasive tissue-based approaches, which include immunohistochemistry and next generation sequencing. These processes are hindered by numerous intrinsic and extrinsic factors. First, the expression of molecular characteristics in GBMs is spatially heterogeneous [A. Sottoriva, et al. Intratumor heterogeneity in human glioblastoma reflects cancer evolutionary dynamics. *Proc Natl Acad Sci USA* 110, 4009-4014 (2013); A. P. Patel, et al. Single-cell RNA-seq highlights intratumoral heterogeneity in primary glioblastoma. *Science* 344, 1396-1401 (2014)]; and hence, a single tissue might not be sufficient for determining the dominant expression of the mutant. Second, molecular characteristics of GBM are temporally heterogeneous [P. C. Gedeon, et al. Rindopepimut: anti-EGFRvIII peptide vaccine, oncolytic. *Drugs Future* 38, 147-155 (2013); M. J. v. d. Bent, et al. Changes in the EGFR amplification and EGFRvIII expression between paired primary and recurrent glioblastomas *Neuro-Oncology* 17, 935-941 (2015); S. P. Niclou, Gauging heterogeneity in primary versus recurrent glioblastoma. *Neuro-Oncology* 17, 907-909 (2015)], i.e., they change their expression status over time both due to disease progression/recurrence and with treatment. This, combined with the fact that repeated biopsies are not considered due to their invasive nature, makes it nearly impossible to evaluate the expression dynamics of molecular characteristics during treatment, and hence, to adapt treatment accordingly. Patient stratification and selection into treatments is limited for the same reason. Third, the biopsy (or resection) of the tumor might not always be possible, such as in cases of deep-seated tumors, where there is insufficient sample size for histopathological assessment and analysis. Finally, retrieval of such molecular characteristics may be unavailable in certain clinical settings, as it requires costly and not widely-available equipment for tissue-based genetic testing, especially when such testing must be performed repeatedly for treatment monitoring.

According to embodiments disclosed herein, the above referenced problems are overcome with a method of quantitative analysis of spatial heterogeneity of peritumoral heterogeneity in magnetic resonance (MR) signals. By way of example and in accordance to one embodiment, the method is directed to quantitative analysis of spatial heterogeneity of peritumoral perfusion imaging dynamics. Accordingly, the analysis performed based on embodiments may be used to construct a non-invasive imaging biomarker of the EGFR mutation status, an important molecular target in GBM as discussed above. Thus, the status of EGFR may be determined based solely on quantitative MRI phenotypes. Suitably, the within-patient peritumoral heterogeneity index (PHI/φ-index, is used to contrast perfusion patterns of immediate and distant peritumoral edema. One suitable program for use in this method is available on: med.upenn.edu/sbia/phiestimator.html, which is hereby incorporated by reference in its entirety.

The above referenced in vivo imaging marker can be particularly useful and important in the preoperative evaluation of the mutant, enabling decisions on the aggressiveness of the resection, and in cases involving recurrent tumors without baseline status and in evaluating the dominant (i.e., global) expression of the mutant, instead of conventional consideration of a single tissue specimen. The disclosed imaging and imaging analysis may also prove helpful in patient selection for clinical trials based on the global (i.e. more unified) expression of mutation status and in retrieving the mutation status in inoperable (e.g. deep-seated) tumors. In addition, the disclosed process may be used to provide a spatial map of EGFRvIII expression, rather than a global measure, and such information may be used to guide more targeted surgical resection and radiation (e.g. with protons).

Accordingly, the methods and techniques disclosed herein provide a robust, reproducible, non-invasive, and clinically relatively easy-to-perform evaluation of an imaging signature of the EGFRvIII expression, for instance, in a GBM. Due to the non-invasive nature of the disclosed technique, use of the in vivo imaging marker may be particularly important in cases of: i) pre-operative evaluation of the mutant, guiding resection aggressiveness; ii) recurrent tumors without baseline status; iii) evaluating the dominant (i.e., global) expression of the mutant, instead of considering a single tissue specimen; iv) patient selection for clinical trials based on the global (i.e., more unified) expression of the mutation status; v) retrieving the mutation status in inoperable (e.g., deep-seated tumors); and vi) post-operative continuous/repeated monitoring of the status of the mutant, hence assisting in dynamically adapting the applied treatment.

The specific imaging signature of EGFRvIII expression may be based on quantitative pattern analysis of clinically used MRI perfusion or other images. The signature has been derived and validated from patients with de novo GBM. More specifically, the imaging signature of EGFRvIII may be directly derived from peritumoral heterogeneity in edematous regions that is consistent with the highly infiltrative nature of EGFRvIII-positive tumors, which are associated with tumor-like perfusion patterns far away from the bulk-tumor, in contrast to EGFRvIII-negative tumors. Further, the EGFRvIII imaging signature is constructed in a manner that is very robust to MR scanner variations, by virtue of evaluating within-patient heterogeneity measures, rather than relying on a patient-wide universal threshold.

Accordingly, embodiments disclosed herein utilize a robust and reproducible in vivo marker of the important above referenced mutation that can be obtained from quantitative analysis of standard clinical images, thereby facilitating non-invasive patient selection for targeted therapy, stratification for clinical trials, prognosis, and repeatable monitoring of the EGFRvIII mutation status during the treatment course and at the time of recurrence in clinical settings. Further, because of the heterogeneity of GBM and the results achieved with different treatment responses, personalized/precision medicine may be more readily utilized and new treatment options may be adopted based on the above referenced targeting of specific molecular characteristics.

Embodiments disclosed herein take into consideration that peritumoral edema occurs as a result of infiltrating tumor cells, as well as a biological response to the angiogenic and vascular permeability factors released by the spatially adjacent tumor cells [E. L. Chang, et al. Evaluation of peritumoral edema in the delineation of radiotherapy clinical target volumes for glioblastoma. *International Journal of Radiation Oncology, Biology, Physics* 68, 144-150 (2007); H. Akbari, et al. Pattern analysis of dynamic susceptibility contrast-enhanced MR imaging demonstrates peritumoral tissue heterogeneity. *Radiology* 273, 502-510 (2014)]. EGFRvIII-positive tumors, which are very aggressive and infiltrative, present imaging signatures consistent with uniformly dense distribution of tumor cells throughout the peritumoral edematous tissue. Conversely, tumors lacking the mutation (i.e., EGFRvIII-negative) have a decreasing/sparser tumor cell burden with increasing distance from the enhancing part of the tumor. Therefore, an assessment of the tumor cell infiltration heterogeneity in peritumoral edematous tissue is discriminatory with respect to EGFRvIII mutation status, and thereby provides a distinctive imaging biomarker in the embodiments.

Although most of the attention in characterizing tumors has been conventionally placed on the tumor itself, the peritumoral edematous region, typically depicted by high T2-FLAIR signal intensity of MR imaging, is submitted as being potentially more important. Despite the fact that more than 90% of tumor recurrences occur in edema due to the highly infiltrative nature of GBM, there is limited research focused in the assessment of this region and its microenvironment [J.-M. Lemee, et al. Intratumoral heterogeneity in glioblastoma: don't forget the peritumoral brain zone. *Neuro-Oncology* 17, 1322-1332 (2015); R. Jain, et al. Outcome Prediction in Patients with Glioblastoma by Using Imaging, Clinical, and Genomic Biomarkers: Focus on the Nonenhancing Component of the Tumor. *Radiology* 272, 484-493 (2014)].

As stated above, peritumoral edema results from infiltrating tumor cells or is simply the biological response to the angiogenic and vascular permeability factors released by the spatially adjacent tumor cells. Although the edematous region surrounding the tumor bulk remains mostly unresected and is generally not aggressively treated, by virtue of being the tumor's "propagating font" is critically important for diagnostic and therapeutic purposes.

Existing healthy/normal blood vessels can provide oxygen and nutrient supplies sufficient for tumors in early stages, but not enough for larger tumors. This results in the phenomenon of ischemia, secretion of angiogenic factors and cytokines that eventually lead to proliferation of new vessels (i.e., neovascularization, increased permeability and edema. These new vessels, when compared with the existing healthy blood vessels, have increasingly tortuous and branched structure, as well as more permeability, which may affect brain circulation.

Alterations in brain circulation can be captured by the dynamic susceptibility contrast material-enhanced magnetic resonance imaging (DSC-MRI) modality, which is based on the decay of T2 or T2-STAR signal during the first pass of a paramagnetic contrast medium through the capillary bed. For example, EGFRvIII-positive tumors, compared to less aggressive EGFRvIII-negative tumors, have uniformly increased cells throughout regions of peritumoral edema that are associated with neovascularization and are readily detectable by analysis of DSC-MRI. Therefore, DSC-MRI enables the generation of a perfusion curve by assessing the dynamic changes in the brightness intensity of a specific region through time. Analysis of this perfusion temporal dynamic information through Principal Component Analysis (PCA) enables microvascular imaging and provides a visual correlation of blood flow, blood volume, and vessel permeability. Examples of temporal perfusion dynamic curves and their summarization through PCA are shown in FIGS. 3-6 discussed below in greater detail.

In accordance with one embodiment, dimensionality reduction methods, such as PCA, are used to analyse and classify tissue from time-series images of perfusion MR images (such as DSC-MRI) of patients with GBM. Here, PCA is utilized for purposes of analyzing substantially the whole time series. In addition, application of machine-learning tools (such as, Support Vector Machine, SVM) on the dimensionality-reduced data from the DSC MR images may be able to provide a robust identification of tissue characteristics for the region of tissue being analysed. The above referenced analysis has been found to uncover peritumoral region tissue characteristics that are clinically important and newly able to be captured by embodiments disclosed herein.

According to one embodiment, peritumoral heterogeneity in the brain of a patient is accessed by defining two separate ROIs within an image or a time-series of images of peritumoral edema of a GBM patient. For example, FIGS. 2A and 2B each disclose an MR image of a patient having a GBM 10 with an enhancing part 12 located within an area of peritumoral edema 14. A first ROI 16 is shown in FIG. 2A (which is a post-contrast T1-weighted MR image) and is located in the image immediately adjacent to the enhancing part 12 of the tumor 10 within the peritumoral edema 14. A second ROI 18 is shown in FIG. 2B (which is a T2-FLAIR MR image) and is located at a farthest distance from the enhancing part 12 of the tumor 10 but still within the peritumoral edema 14 along a periphery thereof.

After the two regions of interest, 16 and 18, are selected and defined, Principal Component Analysis (PCA) is employed to summarize the perfusion temporal dynamics of each of the two ROIs, 16 and 18, into a group of few principal components that may capture, for instance, more than about 95% of the signal's variance.

Thereafter, the Bhattacharyya coefficient, which provides a measure of the amount of overlap between two statistical samples or populations, is used to measure the separability between these summarized perfusion measurements of the two ROIs, 16 and 18 for an individual patient, thereby providing a biomarker of the EGFRvIII expression. This separability measurement is hereinafter referred to as a Peritumoral Heterogeneity Index (PHI), or $\varphi$-index. See FIG. 1.

By way of example, a value of $\varphi$-index which may be close to zero (0) indicates similar perfusion dynamics between the two ROIs, 16 and 18, which is consistent with a deeply and aggressively infiltrating tumor. On the other hand, a value of $\varphi$-index which may be closer to one (1) indicates substantial difference between the perfusion of the two ROIs, 16 and 18, which is consistent with less infiltrative tumor phenotypes whose tumor-like perfusion characteristics are relatively confined to the vicinity of the bulk tumor.

FIG. 1 provides an example showing the results of distributions of separability measurements (i.e., a Peritumoral Heterogeneity Index) between the two ROIs, as discussed above, using the Bhattacharyya coefficient across a patient population of each mutation status (i.e., negative and positive).

For purposes of example, the $\varphi$-index was initially estimated for a discovery cohort of 64 subjects (42 EGFRvIII-negative) diagnosed with de novo GBM and found to display significantly distinct distributions between EGFRvIII-negative and EGFRvIII-positive patients, with median $\varphi$ values of 0.3766 and 0.08, respectively ($p=3.0531\times10^{-10}$, AUC=0.9697). Subsequently, an independent replication cohort of 78 subjects (58 EGFRvIII-negative) was analyzed in the same manner, and the distributions of the $\varphi$-index for the EGFRvIII-negative and EGFRvIII-positive tumors returned equivalently distinctive results, with median values of 0.2738 and 0.0854, respectively ($p=1.2973\times10^{-5}$, AUC=0.8827).

Furthermore, the discovery and replication cohorts discussed above were combined into one large cohort of 142 subjects (100 EGFRvIII-negative), and the distributions of the $\varphi$-index for EGFRvIII-negative and EGFRvIII-positive tumors returned median values of 0.3139 and 0.0854, respectively ($p=2.4668\times10^{-13}$, AUC=0.9176). See FIG. 1 for the $\varphi$-index 20 of EGFRvIII-negative patients and the $\varphi$-index 22 of EGFRvIII-positive patients. The results display very distinctive distributions between EGFRvIII-negative and EGFRvIII-positive patients. Comparison of the median value, as well as the first and the third quartiles, between the two distributions reveals the ability to distinguish between them based solely on these measurements, while indicating the more infiltrative nature of the EGFRvIII-positive tumors. In addition, the relative extent of the infiltrative nature of the EGFRvIII-positive tumors can be shown as any particular value more closely approaches zero (0).

Use of both the two independent cohorts (for the purposes of identification and confirmation of the proposed $\varphi$-index) and the cross-validation over the combined cohort was essential for quantitatively validating the generalization performance of the index and its threshold, as well as providing unbiased performance estimates. Specifically, after obtaining the $\varphi$-index in the discovery cohort (64 subjects), an independent replication cohort (78 subjects) was constructed to confirm the generalization of its discriminatory ability in unseen data. The two cohorts may be referred to as retrospective and prospective, since the images of the replication (i.e., prospective) cohort were obtained after the index was identified in the discovery (i.e., retrospective) cohort and the status of the mutant for all subjects of the replication cohort was obtained after the $\varphi$-index was estimated for all its subjects.

Once the replication cohort confirmed the generalizability of the proposed $\varphi$-index, the two cohorts were combined to a larger single cohort (142 subjects), in order to identify the optimal threshold and evaluate its classification accuracy for the provided data using a nested 10-fold cross-validation over the combined cohort using a model configuration of three sets: the training set, for deriving the predictive model; the validation set, for selecting the optimal threshold for the $\varphi$-index; and the test set, for testing the generalization of predictions on new/unseen data, thereby avoiding optimistically biased estimates of performance. During such configuration, the classification accuracy was firstly estimated for various values of the proposed index and for each fold over the subjects of that training set. Once the index value was found that maximizes the accuracy in the training set, the same value was used to compute the accuracy for the validation examples, not seen in the training set. A large accuracy score obtained for the training set, does not necessarily mean that the $\varphi$ value used for this fold is the optimal one, as it might have been obtained through "overfitting" to the training data. The accuracy score obtained for the training set is likely to be higher than the more general accuracy score (actual generalization score) obtained by applying the method with the proposed $\varphi$ value to new examples, not seen in the training set. Thus, the reported cross-validated performance score and its corresponding index threshold may be considered unbiased. The cross-validated performance was estimated equal to 89.77%, and the optimal threshold of the $\varphi$-index was found to be 0.1377.

Variations detected in the perfusion signal between the near and far ROIs of the peritumoral region, relate to phenotypic characteristics conferred by the presence of the EGFRvIII mutation. Based on the obtained results, we note the EGFRvIII+ tumors having more densely and deeply infiltrating fronts throughout the edematous tissue (i.e., values closer to 0) compared to the less aggressive EGFRvIII− tumors (i.e., values closer to 1). This finding likely relates to the neovascularization associated with EGFRvIII+ tumors, which may be detected by DSC-MRI. This property enabled us to derive a sensitive and specific imaging biomarker based on DSC-MRI. Specifically, as shown in FIG. 1, the distribution of the φ-index values across the EGFRvIII− patient population has a much larger range of values [0.0325-0.8764] and interquartile range (IQR) [0.2186-0.5008] when compared to the distribution across the EGFRvIII+ patients (range: [0.0067-0.2466], IQR: [0.0482-0.1310]). This discrepancy might reflect underlying heterogeneity in molecular expression, which is known to be prevalent in GBM, with the EGFRvIII− patients potentially expressing the mutant in areas that were not sampled for tissue analysis, and tumors that were found to be EGFRvIII+ being more likely to have developed the full phenotype of the mutant.

Furthermore, the narrow range of the φ-index distribution across the EGFRvIII+ patients means that high specificity, in terms of identifying a new/unseen EGFRvIII+ patient, can be achieved without significant loss of sensitivity. This is important for personalized selection of EGFRvIII therapies during the course of a treatment, e.g., if the mutant exists or develops post-operatively, the disclosed approach would detect and monitor its status across a regional volume and allow for potential modification of the applied treatment.

For purposes of statistically evaluating the significance of the obtained results, a two-tailed paired t-test was used between the two distributions in the above referenced combined cohort of 142 subjects. This statistical analysis returned a p-value=$2.4668 \times 10^{-13}$, which confirmed at the 5% significance level that the subjects in the pool of EGFRvIII− and EGFRvIII+, come from populations with unequal means, with the confidence interval on the difference of the means being [0.1921, 0.3162].

Figure 7:
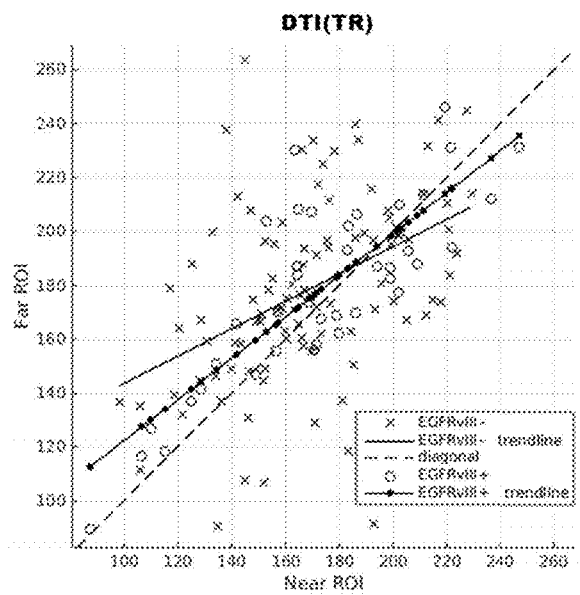
FIG. 7 is a scatter plot of the DTI-TR measure, by EGFRvIII expression status across 140 patients, for the region adjacent to the enhancing tumor (x axis) over the region at the periphery of the edema (y axis).

A receiver operating characteristic (ROC) analysis was also used in the combined cohort to illustrate the performance of the proposed approach on an individual patient basis (see FIG. 7). The ROC curve was created by plotting the sensitivity against the false positive rate (i.e., 1-specificity) at various threshold settings of the φ-index. The threshold set on 0.1377 returned the best accuracy for the proposed approach in the combined cohort, namely equal to 88.73%. The area under the ROC curve is 0.9176, with standard error equal to 0.0304, and 95% confidence interval in the range of 0.8579-0.9773.

Although calculation of the φ-index may be mostly automated, such as via use of computer software or the like, expert drawing and defining of near and far ROIs may be required according to some embodiments. To test the robustness and reproducibility of the index with respect to this expert input, the intra- and inter-rater agreement was evaluated using the Intra-class Correlation Coefficient (ICC). Specifically, 40 subjects of the combined cohort were randomly selected and new near/far regions of interest were annotated by: a) the same operator but on a different instance (3 months later); and b) another independent operator. The repeated set of ROIs was drawn in a much faster and less detailed way, in order to test the reproducibility of the φ index in a more typical clinical setting. The median φ index values for the intra-rater subset were 0.2761 and 0.065 for EGFRvIII− and EGFRvIII+ subjects, respectively (p=$2.8529 \times 10^{-5}$, AUC=0.8846), whereas the median φ values for the inter-rater subset were 0.2273 and 0.1112 (p=0.003, AUC=0.8242). The ICC was computed as 0.825 and 0.725 for the intra- and the inter-rater agreement, respectively.

Accordingly, embodiments disclosed herein provide robust, reproducible, non-invasive and clinically relatively easy-to-perform processes to evaluate the imaging signature of the EGFRvIII expression in GBM, or other tumors. Assessment of the heterogeneity of perfusion temporal dynamics throughout the peritumoral edematous tissue on in vivo MRI data reveals an accurate and reproducible imaging biomarker of the EGFRvIII mutation status, which is important for personalized treatment decisions and response evaluation in patients, for instance, diagnosed with de novo GBM. The results achieved with the embodiments strongly support the strengths of an approach referenced herein as "computational molecular imaging" which detects molecular targets by virtue of their imaging phenotypical patterns, without the need to deliver specialized molecular probes to the tissue. Importantly, these results may be obtained using commonly acquired clinical MRI scans in a clinic.

The ability to non-invasively determine the mutation status of EGFRvIII in patients with GBM, only by assessing MRI perfusion scans, can assist in obtaining the oncogene status quicker and more easily. Application of PCA in the raw DSC-MRI signal reveals informative features that represent distinctive imaging phenotypes correlating to the EGFRvIII status in GBM. The obtained results suggest that the discrimination of the EGFRvIII mutation status, which is critical for personalized treatment decisions and response evaluation, can be achieved based solely on assessing the peritumoral heterogeneity on in vivo perfusion imaging data, whilst obviating costly and not widely-available tissue-based genetic testing. The proposed φ-index contributes to precision medicine, by allowing the identification of an important molecular target on an individual patient basis, using widely available clinical imaging protocols, hence enabling the possibility of treatments targeted to the needs of each individual faster and more easily than the currently invasive options, with the intention of improving patient prospects while minimizing the risk of side effects.

In still another embodiment, the imaging system and apparatus provided herein allows for non-invasive diagnosis of patients having EGFR mutation-associated cancers. This information may be used for treatment of these cancer patients. In certain embodiments, the imaging provided by the system and apparatus described herein allows for targeted surgical resection of operable EGFR associated tumors. For example, the embodiments in the examples herein provide a global estimate of EGFR overexpression and/or mutant expression, which may be used for an aggressive surgical resection (if positive for EGFR mutant). In certain embodiments, this index might capture EGFR mutant expression characteristics even if the histopathologically-analyzed tissue segment turns out to be negative. Thus, this method may be the primary source of information about EGFR overexpression and/or mutant expression, since it would mitigate the usual tissue sampling limitation. This method can be used for screening people into treatment trials prior to surgery. In addition to these, because of the way in which this index is constructed, it is anticipated that the method can provide a spatial map of EGFR overexpression and/or mutant expression, rather than a global measure, and this can guide more targeted surgical resection and radiation (e.g. with protons).

The methods and systems described herein are useful in monitoring the progress of a patient following initiation of treatment. The system allows detection of one or more of: reduced tumor size, reduced peritumoral edematous tissue, and/or reduced presence of tissue having an EGFR mutation. Such patients may have cancers such as glioblastoma, or another EGFR mutation-positive cancer such as lung cancer, including non-small cell lung cancer, among others.

In certain embodiments, the imaging system and methods provided herein may be combined with targeted resection and/or other treatments consistent with the current standard of care, e.g., radiation, chemotherapy, EGFR mutation-targeted treatments, or other non-targeted therapy. Examples of suitable targeting therapies for EGFR, include, e.g., Celldex' CDX-110 (rindopeptimut) with GM-CSF; PF299804, a Pan-HER Irreversible Inhibitor (Pfizer/Grupo Español de Investigación en Neurooncología); AMG 595 (Amgen); temozolomide (ABT-414, commercially available as TEMOMAR®, (temozolomide), Abbott; Erlotinib (Tarceva®, OSI-774) (Genetech); HM781-36B in HNSCC (Yonsei University), amongst others. Still other targeted therapies may include the chimeric antigen receptor (CAR) T-cell therapies, e.g., (trials NCT01454596 and NCT02209376); S. Gil and CH June, Immunol Rev, 2015 January; 263(10: 68-89; S. Krebs et al, Front Oncol, 2013; 3:322 (2013 Dec. 31); M Kalos et al, Science Translation Medicine, Vol. 3, Issue 95, pp 95ra73 (10 Aug. 2011). Suitable doses for the patient may be readily determined. For example, temozolomide 75 mg/m2 for 42 days concomitant with focal radiotherapy followed by initial maintenance dose of 150 mg/m2 once daily for Days 1-5 of a 28-day cycle of temozolomide for 6 cycles. Alternatively, it may be delivered at an initial dose of 150 mg/m2 once daily for 5 consecutive days per 28-day treatment cycle. In another embodiment, temozolomide as an infusion is recommended to be delivered as an intravenous infusion over 90 minutes is the same as the dose for the oral capsule formulation. In another embodiment, erlotinib may be delivered orally, at a dose of about 25 mg, 100 mg, or 150 mg orally, once daily. Still other suitable doses and regimens may be determined. Non-targeted therapies, e.g., carmustine (BCNU) and cisplastinum (cisplatin) are known to those of skill in the art and are not a limitation of the present invention.

The process of the embodiments disclosed herein may be used and evaluated in recurrent, as well as in post-treatment tumors, in order to confirm assessment of their mutant expression levels. Furthermore, a larger cohort may be utilized for a multivariate analysis, including the expression levels of the wt-EGFR amplification, as well as of the other EGFR mutations.

Since the mutant can be sparsely expressed throughout the extent of the tumor, retrieving the mutant status on specific spatially distinct radiologically-guided localized biopsies may be useful. Thus, according to one embodiment, the proposed φ-index may be employed for evaluating the mutant on these specific known locations. Also, a larger cohort may be considered for analysis, consisting of subjects scanned using different equipment, to validate the robustness of the proposed marker to acquisition differences.

According to one embodiment, the above referenced process and techniques may be provided in the form of computer software that, when executed on an electronic processor, is able to automatically classify healthy and unhealthy tissue based on data generated from imaging signals, such as dynamic susceptibility contrast MRI (DSC-MRI). For instance, the computer software may be used to analyze MRI data in a unique manner enabling accurate identification of tumor infiltrated tissue, such as in GBMs. Thus, the software may be used to provide an accurate prediction of cancer localization, infiltration, and recurrence, in particular for GBMs.

The software, provided with the raw DSC-MRI data, may apply an advanced multi-variance statistical procedure, such as PCA, which constructs subtle analyses of tumor heterogeneity. In particular, PCA may be applied to a pair of ROIs, a first ROI on the edematous tissue immediately adjacent to the enhancing part of the tumor and a second ROI at a farthest spaced location from the tumor but still within the edematous tissue.

Thereafter, the Bhattacharyya coefficient, which provides a measure of the amount of overlap between two statistical samples or populations, may be applied by the software to measure the separability between these summarized perfusion measurements of the two regions of interest, thereby providing a biomarker, for instance, of the EGFRvIII expression. Accordingly, use of the above referenced software provides the ability to visualize the peritumoral region with a high degree of precision in GBM patients and permits subtle differences to be recognized.

A further embodiment may also include at least one non-transitory computer readable storage medium having computer program instructions stored thereon that, when executed by at least one processor, can cause the at least one processor to perform any of the process steps described above.

According to another embodiment, a system is provided for carrying out the above reference method. The system may include software or the like provided on a circuit board or within another electronic device and can include various processors, microprocessors, controllers, chips, drives, MRI or other imaging machines, and the like. It will be apparent to one of ordinary skill in the art that systems, modules, processors, servers, and the like may be implemented as electronic components, software, hardware or a combination of hardware and software for purposes of providing the system.

Example

A specific example of use of the above disclosed method is provided below. This method is not a limitation on the invention.

Study Design:

The data used for this example comprises preoperative multi-parametric MRI data from a retrospective cohort of 142 patients (80 males, 62 females) with de novo GBM. The inclusion criteria for these patients comprised; a) the diagnosis of de novo GBM based on pathology, b) EGFRvIII mutation status based on next generation sequencing, and c) availability of contrast-enhanced T1-weighted, T2-FLAIR, and DSC MRI image volumes. Tissue specimens of these patients were obtained by surgical resection and tested for the status of the EGFRvIII mutation. The patient's mean and median age in years was 59.82 and 60.95, respectively (range: 18.65-86.95). The population of 142 patients was distinguished in 100 (70.42%) with EGFRvIII-negative (57 males, 43 females) and 42 (29.58%) with EGFRvIII-positive (23 males, 19 females) status, which is consistent with the incidence of the mutation as mentioned in literature, namely 24-67% [A. B. Heimberger, et al. The natural history of EGFR and EGFRvIII in glioblastoma patients. *Journal of Translational Medicine* 3, (2005)].)]. In the studies described herein, gender and age did not differ significantly between the EGFRvIII– and the EGFRvIII+ patients. No randomization method was used for allocating samples to experimental groups.

Equipment and Imaging Data:

The histological confirmation of GBM diagnosis was performed by a Board Certified neuropathologist reviewing the pathology of surgically resected tissue, according to the WHO classification criteria. The most representative block per resected tissue specimen was chosen by the neuropathologist on the basis of morphology and was included for genetic analysis. The advantage of this and the ability to use Formalin-fixed Paraffin-embedded (FFPE) tissue lies upon the knowledge of the precise characteristics of the material used for RNA extraction, as opposed to other assays based on fresh tissue, in which one may be testing necrosis or inflammation instead of the highest number of tumor cells possible, without the ability to quality control what goes into the assay. An in-house NGS-based assay to detect EGFRvIII transcripts (25, 26) has been developed, which was validated with detection by Taqman Reverse Transcription-Polymerase Chain Reaction (RT-PCR). Total nucleic acid was extracted from FFPE tissue, and complementary DNA was then synthesized from RNA. PCR primers were designed to capture EGFR wild-type, EGFRvIII, three housekeeping genes, and three primer sets with increasing target sizes to assess the level of RNA degradation in the sample. The sequencing library preparation method was a two-step PCR, with multiplex PCR followed by a second PCR to add Illumina sequencing index and adaptors. Subsequently, the sequencing library was quantified, sequenced on Illumina MiSeq, and analyzed using a bioinformatics pipeline developed in our lab, "EGFRvIII Picker". EGFRvIII ratio was calculated by the following formula: EGFRvIII reads/(EGFRvIII reads+EGFR wild-type reads). Based on our results using normal brains and GBMs, our cut-off for EGFRvIII+ is >30% EGFRvIII to wild-type allele ratio.

Determination of EGFRvIII Mutation Status:

The histological confirmation of all tumors was performed by an experienced neuropathologist reviewing the pathology of surgically resected tissue, according to the WHO classification criteria. The most representative block per resected tissue specimen was chosen by the neuropathologist on the basis of morphology and was included for genetic analysis. The advantage of this and the ability to use Formalin-fixed Paraffin-embedded (FFPE) tissue lies upon the knowledge of the precise characteristics of the material used for RNA extraction, as opposed to other assays based on fresh tissue, in which one may be testing necrosis or inflammation instead of the highest number of tumor cells possible, without the ability to quality control what goes into the assay. assay. An in-house NGS-based assay to detect EGFRvIII transcripts (25, 26) has been developed, which was validated with detection by Taqman Reverse Transcription-Polymerase Chain Reaction (RT-PCR). Total nucleic acid was extracted from FFPE tissue, and complementary DNA was then synthesized from RNA. PCR primers were designed to capture EGFR wild-type, EGFRvIII, three housekeeping genes, and three primer sets with increasing target sizes to assess the level of RNA degradation in the sample. The sequencing library preparation method was a two-step PCR, with multiplex PCR followed by a second PCR to add Illumina sequencing index and adaptors. Subsequently, the sequencing library was quantified, sequenced on Illumina MiSeq, and analyzed using a bioinformatics pipeline developed in our lab, "EGFRvIII Picker". EGFRvIII ratio was calculated by the following formula: EGFRvIII reads/(EGFRvIII reads+EGFR wild-type reads). Based on our results using normal brains and GBMs, our cut-off for EGFRvIII+ is >30% EGFRvIII to wild-type allele ratio.

Image Preprocessing

The provided MRI volumes were smoothed using a low-level image processing method, namely Smallest Univalue Segment Assimilating Nucleus, in order to reduce high frequency intensity variations (i.e., noise) in regions of uniform intensity profile while preserving the underlying structure (32). The intensity non-uniformities caused by the inhomogeneity of the magnetic field during image acquisition were removed using a non-parametric, non-uniform intensity normalization algorithm (33). The volumes of all the modalities for each patient were co-registered to the T1-CE anatomic template using a 6-degrees-of-freedom affine registration, and then skullstripped (34).

Regions of Interest and Perfusion Temporal Dynamics

To assess the tumor cell infiltration heterogeneity within the peritumoral edema (i.e., the peritumoral area described by hyper-intensity on the T2-FLAIR volumes) (30), two regions of interest (ROIs) were annotated for each patient by an expert (FIG. 1), blinded to EGFRvIII status. These two ROIs were used to sample tissue located on the two boundaries of edema: near to and far from the tumor, respectively, and hence to evaluate the heterogeneity or spatial gradient of perfusion signals. The T1-CE and T2-FLAIR volumes were used to define the ROIs near to and far from the tumor, respectively. Specifically, the T1-CE volume was used to initially define the ROI adjacent to the enhancing part of the tumor, described by hyper-intense signal on T1-CE, and the T2-FLAIR volume was then used to revise this ROI in terms of all its voxels being within the peritumoral edematous tissue, described by hyper-intense signal on the T2-FLAIR volume. The T2-FLAIR volume was also used to define the ROI at the farthest from the tumor but still within the edematous tissue, i.e. the enhancing FLAIR abnormality signal. These ROIs are described by lines drawn in multiple slices of each image (T1-CE and T2-FLAIR) for each subject, whereas the visual example of FIGS. 2A and 2B show only a single slice. The perfusion temporal dynamics for each of these ROIs were obtained from the DSC-MRI volume (FIG. 2.$a$). Specifically, the perfusion of each voxel during 45 time-points was used to form a feature vector of 45 dimensions. Principal component analysis (PCA) was then used to summarize the perfusion signal of each ROI, as in (31).

Specifically, the property of PCA to represent data as an ellipsoidal population in a lower dimensional space, whilst retaining most of its variance, was exploited on these feature vectors. As shown in FIG. 3B, each of these feature vectors can be represented as a single point in a 3-dimensional space. The voxels of each ROI, with similar dynamic behavior, would form almost elliptical clusters of points (ellipsoids) in this 3-dimensional space. It should be noted that while drawing these ROIs, 1) the voxels of both ROIs are always within the edema, 2) not in proximity to the ventricles, 3) representative of infiltration into white matter and not into grey matter, 4) the distant ROI is at the farthest possible distance from the enhancing part of the tumor while still within edema, and 5) no vessels are involved within any of the defined ROIs, as denoted in the T1-CE volume.

Measurement of Heterogeneity

The Bhattacharyya coefficient (35) is used as a measure of heterogeneity within the peritumoral edema (Peritumoral Heterogeneity Index—PHI, or φ-index), by measuring the separability (range [0,1]) between the summarized ellipsoids of these ROIs for each patient. The Bhattacharyya distance is considered the most reliable for the purpose of measuring the distance of a point observation from a distribution of observations along each principal axis, namely after conducting PCA (36). Robustness Analysis Although calculation of the φ-index is mostly automated, it currently requires expert drawing of the immediate and distant peritumoral ROIs (FIG. 1). To test the robustness and reproducibility of the index with respect to this expert input, the intra- and inter-rater agreements were evaluated, using the Intra-class Correlation Coefficient (ICC). Specifically, 40 patients of the combined cohort were randomly selected and new ROIs were defined by a) the same operator but on a different instance (3 months later); b) another operator. The new set of ROIs was drawn in a much faster and less detailed manner, in order to test the reproducibility of PHI in a more typical clinical setting. The code source and executable installers are available on: world wide web: med.upenn.edu/sbia/phiestimator.html.

Results

Brief Description of the Experiment

Figure 4B:
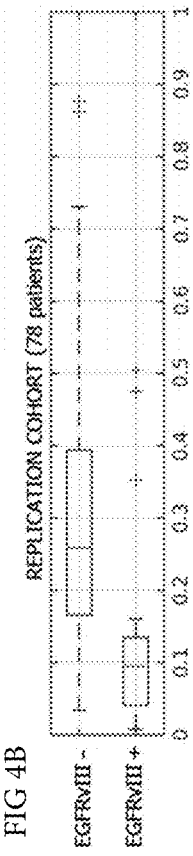
Figure 4C:
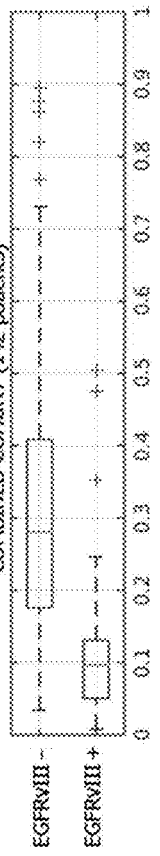

To assess the peritumoral heterogeneity, two ROIs were defined within the peritumoral edema: one ROI adjacent to the enhancing part of the tumor, typically depicted by high T1-CE signal intensity, and the other at the farthest from the tumor but still within the edema FIGS. 2A and 2B. The average size for the near and far ROIs (across all subjects) is 72.2 and 172.3 voxels, respectively, which can be considered sufficient in order to account for potentially noisy voxels included in the ROIs. A recently published method (31) utilizing PCA was employed to summarize the perfusion temporal dynamics of each ROI into a group of few principal components capturing more than 95% of the signal's variance. The Bhattacharyya coefficient (35) was then used to measure the separability between the summarized perfusion measurements of the two ROIs for each patient, and evaluated as a biomarker of EGFRvIII. We refer to this separability measurement as Peritumoral Heterogeneity Index (PHI), or φ-index. Values of the φ-index close to 0 indicate similar perfusion dynamics between the two ROIs, consistent with deeply and aggressively infiltrating and vascularized tumors (37). Such values could also indicate normal phenotype throughout the edema, which is rather unlikely in these aggressively infiltrating tumors. Conversely, values of the φ-index close to 1 indicate substantially different perfusion characteristics between the two ROIs, consistent with a less migratory phenotype of more localized peritumoral infiltration and vascularization, in which tumor-like perfusion characteristics are relatively confined to the vicinity of the tumor. PHI yields significantly distinct distributions for EGFRvIII+ and EGFRvIII− patients The φ-index was initially estimated for a discovery cohort of 64 patients (22 EGFRvIII+) with de novo GBM and displayed significantly distinct distributions between EGFRvIII− and EGFRvIII+ patients ($p=1.5725 \times 10^{-7}$, AUC=0.9459), with median (p values of 0.3097 and 0.0961 and Inter-Quartile Range (IQR) of [0.1855-0.4808] and [0.0509-0.1095], respectively (FIG. 4A). Subsequently, an independent replication cohort of 78 patients (20 EGFRvIII+) was analyzed in the same way, and the φ-index distributions for the EGFRvIII− and EGFRvIII+ tumors returned equivalently distinct results ($p=2.8164 \times 10^{-4}$, AUC=0.8336), with median values of 0.2586 (IQR: [0.1659-0.3938]) and 0.0952 (IQR: [0.0411-0.1348]), respectively (FIG. 4B). The best threshold accuracy=0.9219, specificity=0.9762, sensitivity=0.8182) in the φ-index for the discovery cohort was 0.1372, which when applied to the replication cohort returned an accuracy of 0.8590 (specificity=0.8793, sensitivity=0.8) confirming its generalizability.

Figure 5A:
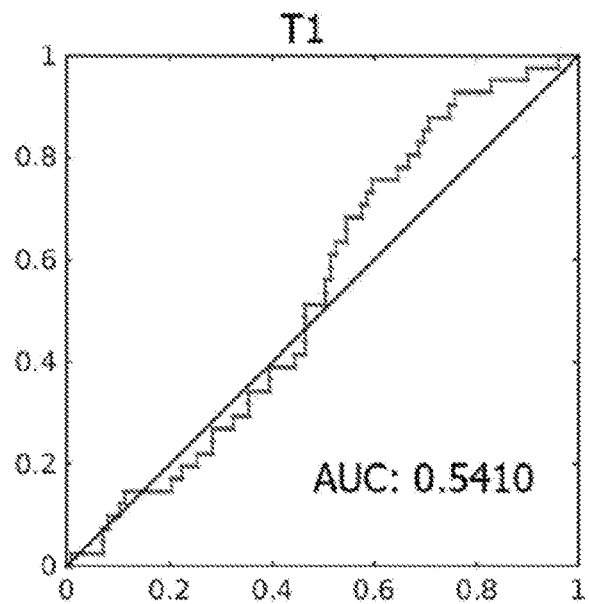
FIGS. 5A-L provides Receiver Operating Characteristics (ROC) Analyses.
Figure 5B:
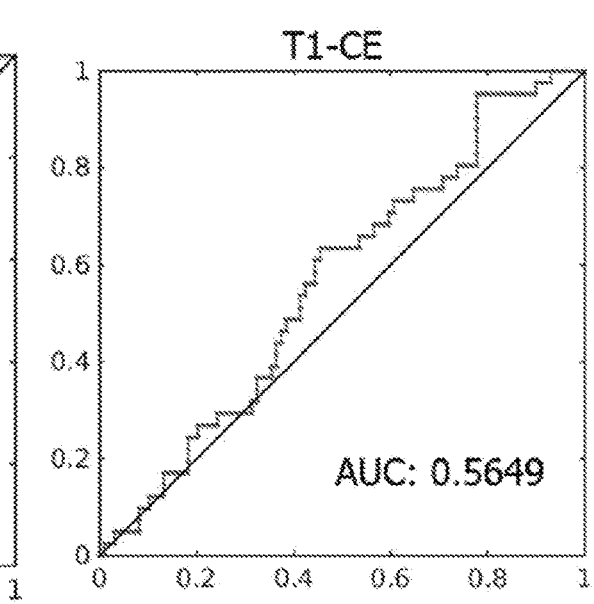
Figure 5C:
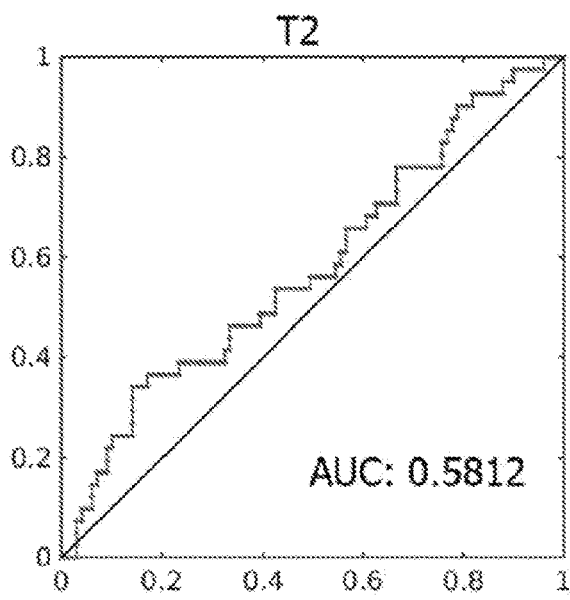
Figure 5D:
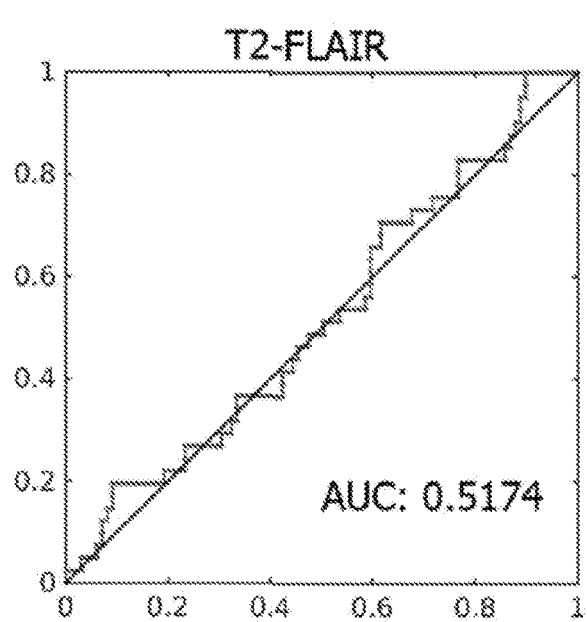
Figure 5E:
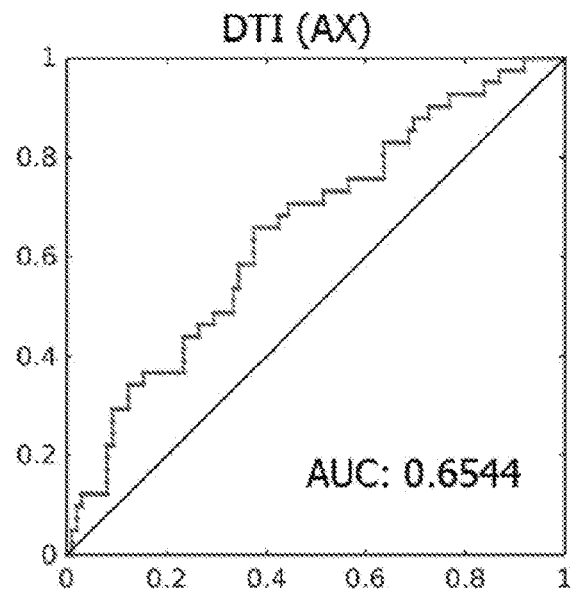
Figure 5F:
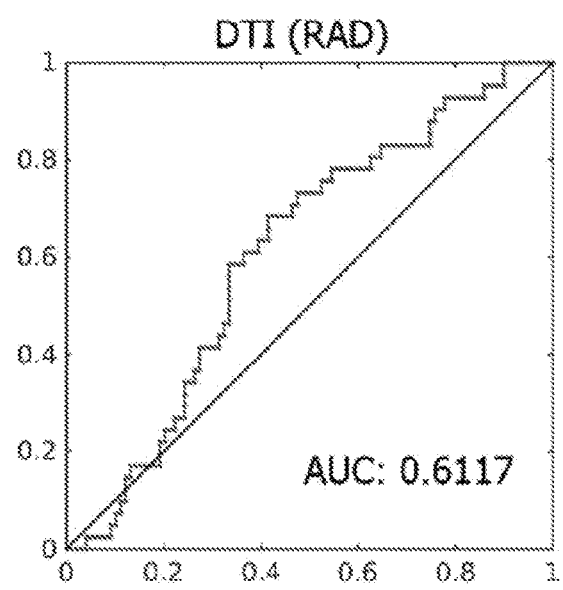
Figure 5G:
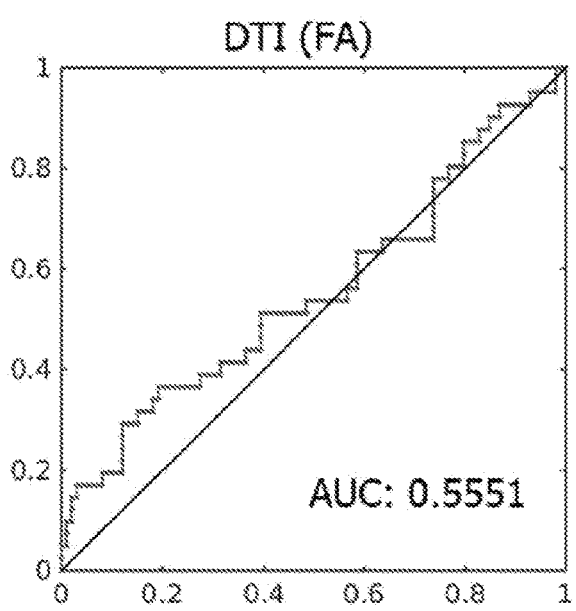
Figure 5H:
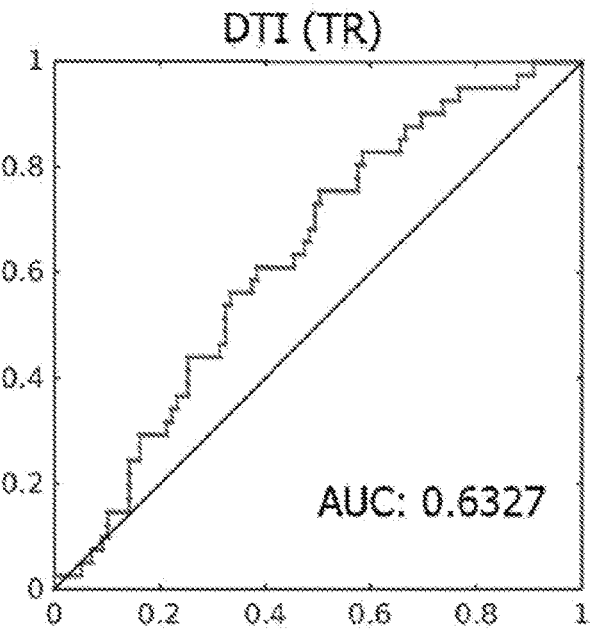
Figure 5I:
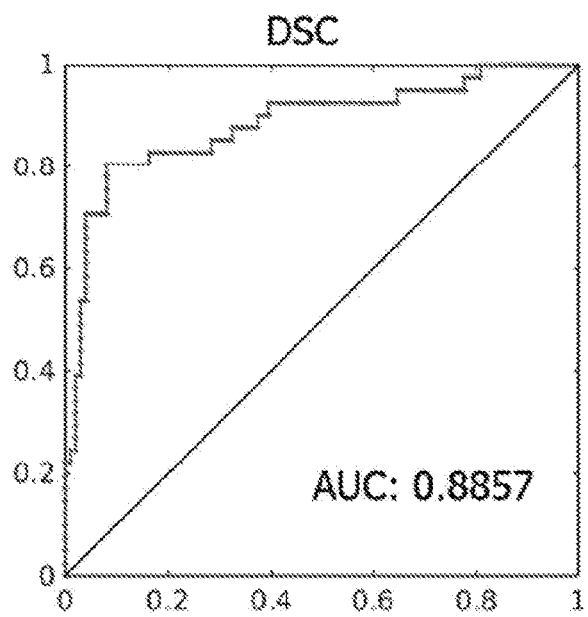
Figure 5J:
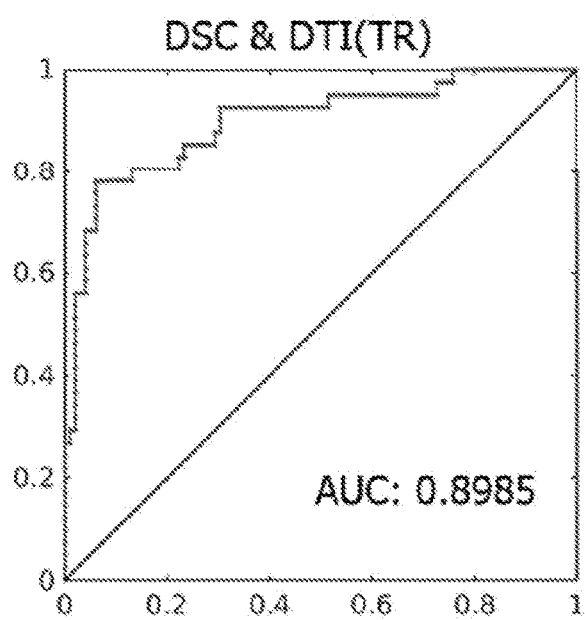

Furthermore, the two cohorts were combined into one larger cohort, of 142 patients (42 EGFRvIII+), and the distinctiveness of the distributions of the φ-index for EGFRvIII− and EGFRvIII+ tumors was even more significant ($p=4.0033 \times 10^{-10}$, AUC=0.8869), with median values of 0.2806 (IQR: [0.1759-0.4088] and 0.0961 (IQR: [0.0505-0.1309]), respectively. Comparison of the median values, as well as the first and the third quartiles, between the two distributions reveals the ability to distinguish between them based solely on the PHI (FIG. 4A). To statistically evaluate the significance of the results obtained for the combined cohort, a two-tailed paired t-test was used to compare between the two distributions (FIG. 3C). This statistical analysis returned a pvalue=$4.0033 \times 10^{-10}$, which confirmed at the 5% significance level that the patients in the pool of EGFRvIII− and EGFRvIII+, come from populations with unequal means, with the confidence interval (CI) on the difference of the means being [0.1526, 0.2795]. A receiver operating characteristic (ROC) analysis was also used in the combined cohort to illustrate the performance of PHI on an individual patient basis (FIG. 5I). The ROC curve was created by plotting the sensitivity against the false positive rate (i.e., 1-specificity) at various thresholds of PHI. The threshold set on 0.1377 returned the best accuracy (88.73%), with sensitivity and specificity equal to 80.95% and 92%, respectively (AUC=0.8869, standard error 0.0351, 95% CI: [0.8180-0.9558]).

Figure 8:
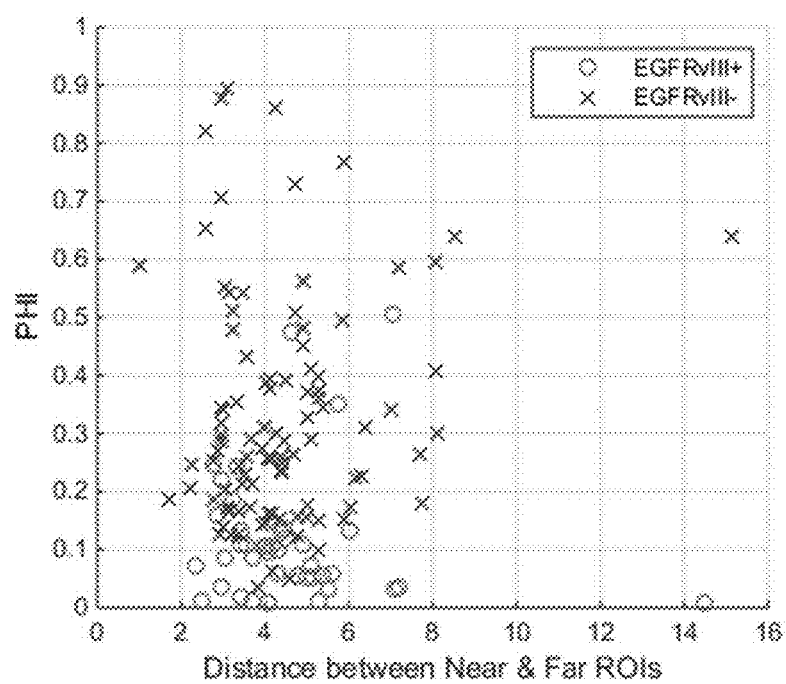
FIG. 8 is a scatter plot of the Peritumoral Heterogeneity Index (PHI) in y axis over the median Euclidean distance between the near and far ROI for each patient, by EGFRvIII expression status across 142 patients. PHI is uncorrelated to the distance of the ROIs (correlation coefficient: 0.0519, p-value=0.5394).
Figure 9:
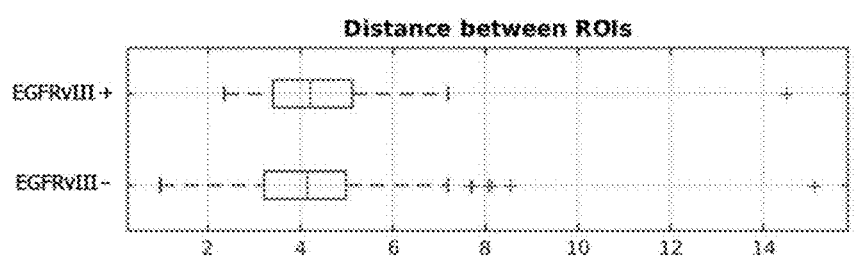
FIG. 9 shows the distributions of the median Euclidean distance between the near and far ROIs for each patient according to their EGFRvIII status. There is no significant difference between the two groups (p-value=0.6728).

To demonstrate that the results of perfusion heterogeneity between the two ROIs for each subject within the two EGFRvIII groups were not confounded by a potentially larger extent of edema in one of the two groups, we assessed the distance between the two ROIs against the φ-index for each patient (FIG. 8) and noted that there is no correlation between them (correlation coefficient: 0.0519, p-value=0.5394). Furthermore, by assessing the distribution of distances between the two ROIs for each EGFRvIII group, we show that the extent of the edema between these two groups has no significant difference (p-value=0.6728) (FIG. 9). This shows that the obtained results of PHI variation between EGFRvIII+ and EGFRvIII− tumors is a true finding and not an effect of different amount of edema observed between the two groups.

Unbiased Estimates of Performance Through Nested Cross-Validation

A nested 10-fold cross-validation was also performed over the combined cohort using a model configuration of three sets: the training set, for deriving the predictive model; the validation set, for selecting the optimal threshold for the φ-index; and the test set, for testing the generalization of predictions on new/unseen data, thereby avoiding optimistically biased estimates of performance. The cross-validated accuracy, sensitivity and specificity were estimated equal to 89.92%, 83.77% and 92.35%, respectively, and the optimal threshold of the φ-index was found to be 0.1377 in consistency with the one found in the ROC analysis.

Repeatability and Reproducibility of PHI

The median φ values for the intra-rater subset were 0.2761 (IQR: [0.1572-0.4046]) and 0.065 (IQR: [0.0389-0.1303]) for EGFRvIII− and EGFRvIII+ patients, respectively ($p=2.8529 \times 10^{-5}$, AUC=0.8846), whereas the median (p values for the inter-rater subset were 0.2273 (IQR: [0.1512-0.3426]) and 0.1112 (IQR: [0.0579-0.1294]) (p=0.003, AUC=0.8242). The ICC was 0.825 among the same rater and 0.775 among different raters.

Discriminative Value of Other MRI Modalities

Additional MRI modalities were assessed to investigate their discriminative ability, compared to that of the DSC-MRI. These comprised: native T1-weighted (T1), T1-CE, T2, T2-FLAIR, DTI(TR), DTI(FA), DTI(RAD) and DTI(AX). The number of patients was reduced to 140 due to data availability. It is observed that all additional modalities had notably poorer discrimination ability (FIGS. 4A-4H) and the distributions of PHI for each of them were not distinct between the different EGFRvIII genotypes. Furthermore, a support-vector-machine was used for a multivariate analysis of a complete joint/multifaceted model, where only the DTI(TR) (p=0.0053) and T1 (p=0.0054) were found to be significant (38), additive to the DSC. ROC analysis of these two joint models, namely DSC-TR and DSC-TR-T1 showed very small improvement over DSC-MRI alone (FIG. 5I, FIG. 5K), with AUCDSC=0.8857, AUCDSC-TR=0.8985 and AUCDSC-TR-T1=0.9019.

DISCUSSION

This study is the first to establish a robust, reproducible, non-invasive and easy to evaluate imaging signature of EGFRvIII in de novo GBM, based on quantitative analysis of peritumoral regions and not on assessment of intratumoral regions that the current general knowledge and understanding of the EGFRvIII status in GBMs is currently based. The results demonstrate that assessment of the heterogeneity of perfusion temporal dynamics throughout the peritumoral edema on in vivo MRI data predicts the EGFRvIII mutation status, hence reveals an accurate (89.92%), sensitive (83.77%) and specific (92.35%) imaging biomarker of the mutation, which can be used clinically for personalized treatment decisions and response evaluations.

EGFRvIII identification in GBM patients using radiographic analysis alone holds significant clinical relevance in terms of personalized medicine. Traditional identification of genomic mutations, such as EGFRvIII by tissue-based techniques, requires invasive surgical resection or biopsy, and is obtained from a single tissue specimen, whereas we report a non-invasive, purely image-based approach for pre-operative evaluation of this molecular target. Since glioma cells bearing the mutant are not uniformly distributed throughout a tumor, sampling error may occur with tissue-based approaches. Conversely, imaging captures the tumor's spatial heterogeneity more completely, minimizes bias potentially occurring by evaluating a limited portion of tumor, and can provide data on the regional EGFRvIII expression. Such global assessment of the mutant could be used as a more accurate guide to patient selection for clinical trials. Furthermore, once the mutation is identified, EGFRvIII-targeted therapies can be selected. In addition to selecting initial treatment, there may be significant value in detection of EGFRvIII at additional time-points following treatment initiation, as it has been shown that expression of the mutant may be lost at the time of progression (29) following standard chemo-radiation in approximately half of patients (28). There is also a high probability (>80%) of losing EGFRvIII expression following EGFRvIII peptide vaccination (27). Consistent with this finding, antigen editing with quantitative loss of EGFRvIII is also observed, after infusion of genetically modified chimeric antigen receptor (CAR) T-cells targeting EGFRvIII in recurrent GBM patients (21). By using standard clinical imaging sequences, a longitudinal evaluation of EGFRvIII in patients both after treatment and with recurrent tumors, represents a feasible approach to detect changes in EGFRvIII expression. Unlike repeated biopsies, such monitoring can be performed repeatedly without risk and with decreased cost over time. Thus, an imaging-based approach for EGFRvIII identification can aid in all phases of care of the GBM patient from diagnosis to targeted therapy to response surveillance. Although most of the attention in characterizing tumors has been placed on the tumor bulk, the peritumoral edema, typically depicted by high T2-FLAIR signal intensity, holds much additional data. Despite the fact that more than 90% of recurrences occur in edema (39) due to the highly infiltrative nature of GBM, there is limited research focused on the assessment of this region and its microenvironment (2, 40). Edema results from infiltrating tumor cells and the biological response to the angiogenic and vascular permeability factors released by the spatially adjacent tumor cells (31). Although the peritumoral edema remains mostly unresected and is generally not aggressively treated, by virtue of hosting the tumor's "propagating font" it is critically important for diagnostic and therapeutic purposes.

Large GBM tumors typically outgrow their blood supply, which results in ischemia, secretion of angiogenic factors, such as vascular endothelial growth factor (VEGF), and cytokines that eventually lead to neovascularization, increased permeability, and edema (41, 42). These new vessels, when compared with the existing healthy blood vessels, have an increasingly tortuous and branched structure, as well as higher permeability, which typically affect the brain circulation. Such alterations in the brain circulation are captured by DSC-MRI, which is based on the decay of T2 signal during the first pass of a paramagnetic contrast medium through the capillary bed. Therefore, DSC-MRI enables the generation of a perfusion curve by assessing the dynamic changes in the signal intensity of the peritumoral region of a GBM through time. Analysis of the complete perfusion signal through PCA enables microvascular imaging and provides a visual correlation of blood flow, blood volume, and vessel permeability (31).

Figure 5K:
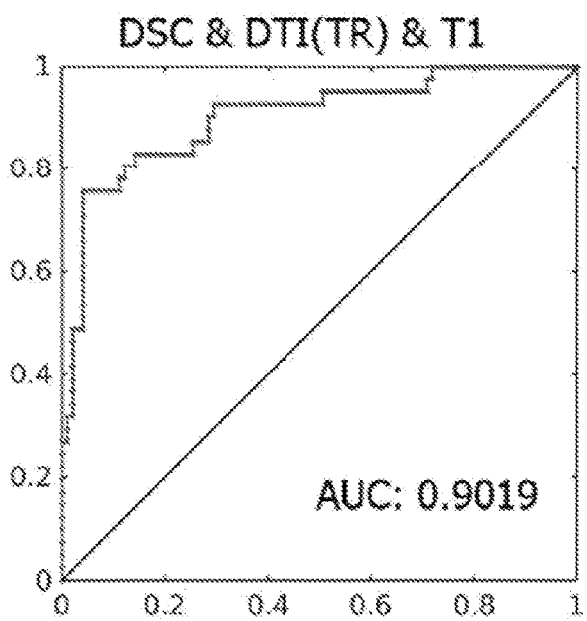
Figure 5L:
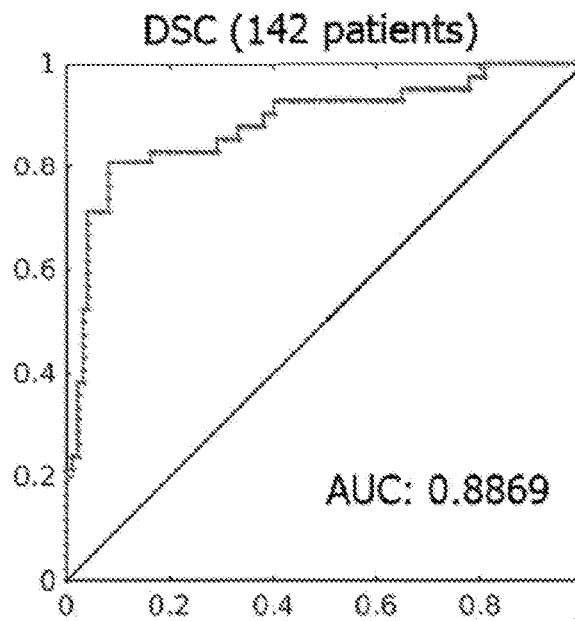

Variations in the perfusion signal between the immediate and distant peritumoral ROIs relate to phenotypic characteristics conferred by the presence of EGFRvIII. Based on the φ-index, we found that EGFRvIII+ tumors had very similar, and relatively normal immediate and distant peritumoral perfusion patterns, in contrast to the EGFRvIII− tumors (FIG. 3). This finding is consistent with relatively more locally infiltrating EGFRvIII− tumors, accompanied by localized immediate peritumoral vascularization. Note that "more locally infiltrating" does not refer to a generally more infiltrative tumor. Conversely, deeply infiltrating and migrating EGFRvIII+ tumors displayed a more uniform peritumoral perfusion phenotype, consistent with less intense peritumoral vascularization facilitated by the migratory characteristics of EGFRvIII+ tumors that likely allows them to gain access to blood supply farther from the bulk of the tumor. Differences in the perfusion signal (FIG. 3) enabled us to derive an accurate, sensitive and specific imaging biomarker based on DSC-MRI. Specifically, the distribution of the φ-index values (FIG. 4C) across the EGFRvIII population has a much larger range of values [0.0340-0.8944] and IQR [0.1759-0.4088] when compared to the distribution across the EGFRvIII+ patients (range: [0.0080-0.5039], IQR: [0.0505-0.1309]). This discrepancy might reflect the underlying expression heterogeneity (2-5), which is prevalent in GBM, with the EGFRvIII− patients potentially expressing the mutant form in areas that were not sampled for tissue analysis, and tumors that were found to be EGFRvIII+ being more likely to have developed the full phenotype of the mutant. It is well-documented that oncogenic EGFRvIII confers a more motile and invasive phenotype to neural stem cells (43) and GBM cells (37). Furthermore, the narrow range of the φ-index distribution across the EGFRvIII+ patients suggests high specificity in terms of identifying a new EGFRvIII+ patient, which can be achieved without significant loss of sensitivity. DSC-MRI alone was the focus of this study, even though is an advanced imaging modality that is not always available. However, mounting evidence for the importance of this modality (18, 31, 40) has rapidly increased its adoption in standard clinical settings. Nevertheless, assessment of additional MRI modalities to investigate if a joint/multifaceted model of the peritumoral heterogeneity could lead to an improved biomarker of EGFRvIII showed that only DTI(TR) and T1 were significant, in addition to DSC-MRI (FIG. 5K-FIG. 5I). However, considering the improvement offered by including these modalities, we still think there is little value in adding other MRI modalities to DSC, unless those additional sequences are acquired anyway for other reasons. Notably, we found that the differences in PHI between the EGFRvIII+ and EGFRvIII− patients were minimal for DTI(TR) (FIG. 6). This would be consistent with similar cell density between the two defined ROIs and for both EGFRvIII genotypes. The actual difference between the EGFRvIII+ and the EGFRvIII− patients lays in the gradient of vascularization throughout the edema that looks to be almost identical for the EGFRvIII+ patients, as opposed to the EGFRvIII− patients, who show a larger drop in the perfusion of the immediate peritumoral ROI, i.e. more confined infiltration and vascularization (FIG. 3, FIG. 7). This implies that the EGFRvIII− patients might benefit from a slightly more extended resection and focused radiation, in order to include the immediate peritumoral edema.

Figure 10A:
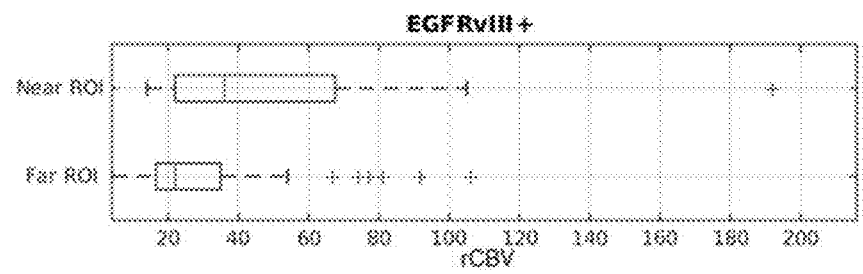
FIGS. 10A and 10B illustrate leakage corrected rCBV distributions for each ROI of each subgroup.
Figure 10B:
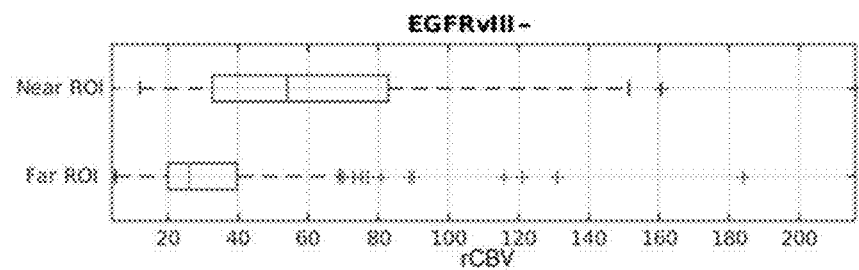

Our study has several aspects that distinguish it from prior related studies (18, 40, 44-47), which were either demonstrating population-wide associations, thereby not focusing on establishing an individual-patient biomarker, or not validating their results in an independent replication cohort, which is critical for a clinically useful biomarker. Firstly, and most importantly, the results obtained in our study are based on individual-patient in vivo measures and show high accuracy in addition to providing pathophysiological insights, hence increasing the likelihood of the $\varphi$-index being clinically applicable. Secondly, instead of limiting the use of perfusion imaging in retrieving isolated hemodynamic features (e.g., leakage corrected relative cerebral blood volume (FIG. 10A-FIG. 10B), we employ the complete perfusion signal via PCA, which allows for more comprehensive analysis as it encapsulates the complete hemodynamic information. Thirdly, instead of reporting only results on a discovery set, we use two independent cohorts for the purpose of dentification (initial discovery set) of the proposed $\varphi$-index and confirmation (independent replication cohort) of its discriminatory generalizability in unseen data. These two cohorts could be noted as retrospective and prospective, since the images of the replication (i.e., prospective) cohort were obtained after the index was identified in the discovery (i.e., retrospective) cohort, and EGFRvIII status for the replication cohort was obtained after the $\varphi$-index was estimated for all its patients. Furthermore, we combined these two cohorts under a nested cross-validation scheme, to quantitatively validate the generalization performance of PHI and its threshold, whilst providing unbiased performance estimates. The advantage of cross-validation lies upon the observation that high accuracy score obtained for the training set, might have been obtained through "overfitting" to the training data. The accuracy score obtained for the training set is likely to be higher than the accuracy score obtained by applying the method to new examples, not seen in the training set. Thus, the reported cross-validated performance score and its corresponding $\varphi$-index threshold may be considered unbiased. Additionally, none of these previous studies investigate for the reproducibility of their findings, whereas in our case both inter- and intra-rater agreements are evaluated in almost one third of the included data. This study evaluated the expression status of EGFRvIII alone, as a binary present/absent value, and did not account for other mutations or amplifications in EGFR that might alter the perfusion signal. However, the frequency of EGFRvIII was similar to the rates reported in the literature (11). It is known that EGFR amplification may increase between the initial diagnosis and recurrence (28), and that loss of EGFRvIII may be due to EGFR amplification and individual cells harboring varying levels of EGFRvIII (48) or even regulated by the tumor (49). Thus, it would be informative to include the EGFR amplification values in a future analysis, which could further explain the widespread of PHI values for the EGFRvIII− tumors. We currently consider patients labeled as EGFRvIII−, but with low $\varphi$-index values, as patients that may potentially express the mutant in areas that were not sampled for tissue analysis, resulting in inappropriate classification. Future prospective studies could be conducted for retrieving the mutant status on specific spatially distinct radiologically-guided localized biopsies, as described in other studies (4, 50). Then, the proposed $\varphi$-index would be employed for evaluating the mutant on these specific known locations, facilitating the creation of a parametric map of EGFRvIII expression. Last but not least, a larger cohort should be considered for analysis, consisting of patients scanned using different equipment, with the intention of validating the robustness of the proposed marker to acquisition differences. The ability to non-invasively determine the status of EGFRvIII in GBM patients, only by assessing DSC-MRI scans, can assist in obtaining the mutant status faster and more easily. Application of PCA in the raw DSC-MRI signal reveals informative features that represent distinctive imaging phenotypes correlating to EGFRvIII in GBM. This EGFRvIII imaging signature is constructed in a manner that should be robust to MRI scanner variations, by virtue of evaluating within-patient heterogeneity measures, rather than relying on population-wide associations (45-47). The obtained cross-validated results demonstrate that discrimination of the EGFRvIII status, which is critical for personalized treatment decisions and response evaluation, can be achieved based solely on assessing the peritumoral heterogeneity on in vivo perfusion imaging data, whilst potentially obviating costly and not widely-available tissue-based genetic testing. The cross validation scheme over the available patient data provided unbiased performance estimates and quantitatively validated the generalization performance of the $\varphi$-index and its classification threshold. The $\varphi$-index contributes to personalized medicine by allowing the identification of an important molecular target on an individual patient basis, using widely available clinical imaging protocols. These characteristics enable the identification of individual patients that could benefit from selective treatments in a more efficient and less invasive way than by current options, with the intention of improving patient prospects while minimizing the risk of side effects.

CITATIONS

Johnson D R, O'Neill B P. Glioblastoma survival in the United States before and during the temozolomide era. Journal of Neuro-Oncology. 2011; 107:359-64.
2. Lemee J-M, Clavreul A, Menei P. Intratumoral heterogeneity in glioblastoma: don't forget the peritumoral brain zone. Neuro-Oncology. 2015; 17:1322-32.
3. Aum D J, Kim D H, Beaumont T L, Leuthardt E C, Dunn G P, Kim A H. Molecular and cellular heterogeneity: the hallmark of glioblastoma. Neurosurg Focus. 2014; 37:E11.
4. Sottoriva A, Spiterib I, Piccirillo S G M, Touloumis A, Collins V P, Marioni J C, et al. Intratumor heterogeneity in human glioblastoma reflects cancer evolutionary dynamics. Proc Natl Acad Sci USA. 2013; 110:4009-14.
5. Patel A P, Tirosh I, Trombetta J J, Shalek A K, Gillespie S M, Wakimoto H, et al. Single-cell RNA-seq highlights intratumoral heterogeneity in primary glioblastoma. Science. 2014; 344:1396-401.
6. O'Rourke D, Chang S. Pilot Study of Autologous T Cells Redirected to EGFRVIII- With a Chimeric Antigen Receptor in Patients With EGFRvIII+ Glioblastoma (ClinicalTrials.gov Identifier: NCT02209376). 2014.
7. Gan H, Cvrljevic A, Johns T. The epidermal growth factor receptor variant III(EGFRvIII): where the wild things are altered. FEBS Journal. 2013; 280:5350-70.
8. Verhaak R, Hoadley K, Purdom E, Wang V, Qi Y, Wilkerson M, et al. Integrated Genomic Analysis Identifies Clinically Relevant Subtypes of Glioblastoma Characterized by Abnormalities in PDGFRA, IDH1, EGFR, and NF1. Cancer Cell. 2010; 17:98-110.
9. Brennan C W, Verhaak R G W, McKenna A, Campos B, Noushmehr H, Salama S R, et al. The Somatic Genomic Landscape of Glioblastoma. Cell. 2013; 155:462-77.
10. Humphrey P, Wong A, Vogelstein B, Zalutsky M, Fuller G, Archer G, et al. Anti-synthetic peptide antibody reacting at the fusion junction of deletion-mutant epidermal growth factor receptors in human glioblastoma. Proc Natl Acad Sci USA 1990; 87:4207-11.
11. Heimberger A B, Suki D, Yang D, Shi W, Aldape K. The natural history of EGFR and EGFRvIII in glioblastoma patients. Journal of Translational Medicine. 2005; 3.
12. Arteaga C. Epidermal growth factor receptor dependence in human tumors: more than just expression? Oncologist. 2002; 7:31-9.
13. Nishikawa R, Ji X, Harmon R, Lazar C, Gill G, Cavenee W, et al. A mutant epidermal growth factor receptor common in human glioma confers enhanced tumorigenicity. Proc Natl Acad Sci USA. 1994; 91:7727-31.
14. Heimberger A B, Hlatky R, Suki D, Yang D, Weinberg J, Gilbert M, et al. Prognostic effect of epidermal growth factor receptor and EGFRvIII in glioblastoma multiforme patients. Clinical Cancer Research. 2005; 11:1462-6.
15. Gan H K, Kaye A H, Luwor R B. The EGFRvIII variant in glioblastoma multiforme. Journal of Clinical Neuroscience. 2009; 16:748-54.
16. Fan Q-W, Cheng C K, Gustafson W C, Charron E, Zipper P, Wong R A, et al. EGFR Phosphorylates Tumor-Derived EGFRvIII Driving STAT3/5 and Progression in Glioblastoma. Cancer Cell. 2013; 24:438-49.
17. Sampson J H, Archer G E, Mitchell D A, Heimberger A B, Bigner D D. Tumor-specific immunotherapy targeting the EGFRvIII mutation in patients with malignant glioma. Semin Immunol. 2008; 20:267-75.
18. Tykocinski E S, Grant R A, Kapoor G S, Krejza J, Bohman L E, Gocke T A, et al. Use of magnetic perfusion-weighted imaging to determine epidermal growth factor receptor variant III expression in glioblastoma. Neuro-Oncology. 2012; 14:613-23.
19. Kalman B, Szep E, Garzuly F, Post D E. Epidermal growth factor receptor as a therapeutic target in glioblastoma. Neuromolecular medicine. 2013; 15:420-34.
20. Veliz I, Loo Y, Castillo O, Karachaliou N, Nigro O, Rosell R. Advances and challenges in the molecular biology and treatment of glioblastoma—is there any hope for the future? Ann Trans Med. 2015; 3:7.
21. O'Rourke D, Desai A, Morrissette J, Martinez-Lage M, Nasrallah M, Brem S, et al. Pilot Study of T Cells Redirected to EGFRvIII with a Chimaric Antigen Receptor in Patients with EGFRvIII+ Glioblastoma. Neuro Oncol. 2015; 17:v110-v1.
22. Celldex. Phase III Study of Rindopepimut/GM-CSF in Patients With Newly Diagnosed Glioblastoma (ACT IV) (ClinicalTrials.gov Identifier: NCT01480479). 2011.
23. Celldex. A Study of Rindopepimut/GM-CSF in Patients With Relapsed EGFRvIII-Positive Glioblastoma (Re-ACT) (ClinicalTrials.gov Identifier: NCT01498328). 2011.
24. Thomas A A, Brennan C W, DeAngelis L M, Omuro A M. Emerging therapies for glioblastoma. JAMA Neurol. 2014; 71:1437-44.
25. Daber R, Sukhadia S, Morrissette J J. Understanding the limitations of next generation sequencing informatics, an approach to clinical pipeline validation using artificial data sets. Cancer Genet. 2013; 206:441-8.
26. Hiemenz M C, Kadauke S, Lieberman D B, Roth D B, Zhao J, Watt C D, et al. Building a Robust Tumor Profiling Program: Synergy between Next-Generation Sequencing and Targeted Single-Gene Testing. PLoS One. 2016; 11:e0152851.
27. Gedeon P C, Choi B D, Sampson R I, Bigner D D. Rindopepimut: anti-EGFRvIII peptide vaccine, oncolytic. Drugs Future. 2013; 38:147-55.
28. Bent MJvd, Gao Y, Kerkhof M, Kros J M, Gorlia T, Zwieten Kv, et al. Changes in the EGFR amplification and EGFRvIII expression between paired primary and recurrent glioblastomas Neuro-Oncology. 2015; 17:935-41.
29. Niclou S P. Gauging heterogeneity in primary versus recurrent glioblastoma. Neuro-Oncology. 2015; 17:907-9.
30. Yamahara T, Numa Y, Oishi T, Kawaguchi T, Seno T, Asai A, et al. Morphological and flow cytometric analysis of cell infiltration in glioblastoma: a comparison of autopsy brain and neuroimaging. Brain Tumor Pathology. 2010; 27:81-7.
31. Akbari H, Macyszyn L, Da X, Wolf R, Bilello M, Verma R, et al. Pattern analysis of dynamic susceptibility contrast-enhanced MR imaging demonstrates peritumoral tissue heterogeneity. Radiology. 2014; 273:502-10.
32. Smith S M, Brady J M. SUSAN—a new approach to low level image processing. International Journal of Computer Vision. 1997; 23:45-78.
33. Sled J, Zijdenbos A, Evans A. A nonparametric method for automatic correction of intensity nonuniformity in MRI data. IEEE Transactions on Medical Imaging. 1998; 17:87-97.
34. Jenkinson M, Beckmann C F, Behrens T E, Woolrich M W. FSL. NeuroImage. 2012; 62:782-90.
35. Bhattacharyya A. On a measure of divergence between two statistical populations defined by their probability distributions. Bulletin of the Calcutta Mathematical Society. 1943; 35:99-109.
36. Kailath T. The Divergence and Bhattacharyya Distance Measures in Signal Selection. IEEE Transactions on Communication Technology. 1967; 15:52-60.
37. Lal A, Glazer C A, Martinson H M, Friedman H S, Archer G E, Sampson R I, et al. Mutant epidermal growth factor receptor up-regulates molecular effectors of tumor invasion. Cancer Research. 2002; 62:3335-9.
38. Gaonkar B, Davatzikos C. Analytic estimation of statistical significance maps for support vector machine based multi-variate image analysis and classification. NeuroImage. 2013; 78:270-83.
39. Petrecca K, Guiot M-C, Panet-Raymond V, Souhami L. Failure pattern following complete resection plus radiotherapy and temozolomide is at the resection margin in patients with glioblastoma. Journal of Neurooncology. 2013; 111:19-23.
40. Jain R, Poisson L M, Gutman D, Scarpace L, Hwang S N, Holder C A, et al. Outcome Prediction in Patients with Glioblastoma by Using Imaging, Clinical, and Genomic Biomarkers: Focus on the Nonenhancing Component of the Tumor. Radiology. 2014; 272:484-93.
41. Kerbel R S. Tumor angiogenesis: past, present and the near future. Carcinogenesis. 2000; 21:505-15.
42. Bullitt E, Zeng D, Gerig G, Aylward S, Joshi S, Smith J K, et al. Vessel tortuosity and brain tumor malignancy: a blinded study. Acad Radiol. 2005; 12:1232-40.
43. Boockvar J A, Kapitonov D, Kapoor G, Schouten J, Counelis G J, Bogler O, et al. Constitutive EGFR signaling confers a motile phenotype to neural stem cells. Mol Cell Neurosci. 2003; 24:1116-30.
44. Arevalo-Perez J, Thomas A A, Kaley T, Lyo J, Peck K K, Holodny A I, et al. T1-Weighted Dynamic Contrast-Enhanced MRI as a Noninvasive Biomarker of Epidermal Growth Factor Receptor vIII Status. AJNR Am J Neuroradiol. 2015; 36:2256-61.
45. Gevaert O, Mitchell L A, Achrol A S, Xu J, Echegaray S, Steinberg G K, et al. Glioblastoma multiforme: exploratory radiogenomic analysis by using quantitative image features. Radiology. 2014; 273:168-74.
46. Ellingson B M. Radiogenomics and imaging phenotypes in glioblastoma: novel observations and correlation with molecular characteristics. Curr Neurol Neurosci Rep. 2015; 15:506.
47. Batmanghelich N, Dalca A, Quon G, Sabuncu M, Golland P. Probabilistic Modeling of Imaging, Genetics and Diagnosis. IEEE Trans Med Imaging. 2016; Epub ahead of print.
48. Johnson B E, Mazor T, Hong C, Barnes M, Aihara K, McLean C Y, et al. Mutational Analysis Reveals the Origin and Therapy-Driven Evolution of Recurrent Glioma. Science. 2014; 343:189-93.
49. Vecchio C A D, Giacomini C P, Vogel H, Jensen K C, Florio T, Merlo A, et al. EGFRvIII gene rearrangement is an early event in glioblastoma tumorigenesis and expression defines a hierarchy modulated by epigenetic mechanisms. Oncogene. 2013; 32:2670-81.
50. Gill B J, Pisapia D J, Malone H R, Goldstein H, Lei L, Sonabend A, et al. MRI-localized biopsies reveal subtype-specific differences in molecular and cellular composition at the margins of glioblastoma. Proc Natl Acad Sci USA. 2014; 111:12550-5.

All publications cited in this specification, including those specifically recited above, are incorporated herein by reference. Also incorporated by reference herein is U.S. Provisional Patent Application No. 62/484,034, filed Apr. 11, 2017 and U.S. Provisional Patent Application No. 62/325,764, filed Apr. 21, 2016, and the code at (world wide web) med.upenn.edu/sbia/phiestimator.html.

While the principles of the invention have been described above in connection with specific devices, apparatus, systems, algorithms, and/or methods, it is to be clearly understood that this description is made only by way of example and not as limitation. One of ordinary skill in the art will appreciate that various modifications and changes can be made without departing from the scope of the claims below.

The above description illustrates various embodiments along with examples of how aspects of particular embodiments may be implemented, and are presented to illustrate the flexibility and advantages of particular embodiments as defined by the following claims, and should not be deemed to be the only embodiments. One of ordinary skill in the art will appreciate that based on the above disclosure and the following claims, other arrangements, embodiments, implementations and equivalents may be employed without departing from the scope hereof as defined by the claims. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A method for targeted treatment of a patient having a neoplasm associated with an epidermal growth factor receptor (EGFR) mutation, the method comprising:
   (a) detecting an epidermal growth factor receptor variant (EGFR) mutation status within peritumoral edematous tissue of a patient using a computer-implemented method for in vivo detection of an epidermal growth factor receptor (EGFR) mutation status within peritumoral edematous tissue, comprising executing on a processor the steps of: performing quantitative pattern analysis of magnetic resonance imaging (MRI) data corresponding to MRI of in vivo peritumoral edematous tissue to determine a level of spatial heterogeneity or similarity within the in vivo peritumoral edematous tissue; assigning EGFR mutation status as one of negative or positive based on the level of spatial heterogeneity or similarity determined during said performing step; and
   (b) treating a patient with a EGFR-targeting therapy.

2. The method according to claim 1, wherein the mutation comprises one or more of a point mutation at EGFR variant A289, a point mutation at EGFR variant G598V, and/or a point mutation at EGFR variant R108, with reference to the residue numbering of SEQ ID NO: 1.

3. The method according to claim 2, wherein the mutation comprises a point mutation at EGFR A289.

4. The method according to claim 3, wherein the mutation further comprises a point mutation at one or more of EGFR variant G598, and/or a point mutation at EGFR variant R108, or a point mutation at EGFR variant R108, with reference to the residue numbering of SEQ ID NO: 1.

5. The method according to claim 2, wherein the mutation comprises one or more of point mutation at EGFR A289V, a point mutation at EGFR variant G598V, and/or a point mutation at EGFR variant R108K, or a point mutation at EGFR variant R108G, with reference to the residue numbering of SEQ ID NO: 1.

6. The method according to claim 1, wherein the EGFR-targeting therapy is a chimeric antibody receptor (CAR) T-cell therapy comprising an anti-EGFR targeted component.

7. The method according to claim 1, wherein the EGFR-targeting therapy is an anti-EGFRvIII peptide vaccine.

8. The method according to claim 1, wherein the computer-implemented method further comprises analysis of MRI data selected from: dynamic susceptibility contrast material-enhanced magnetic resonance imaging (DSC-MRI) data, dynamic contrast enhanced (DCE) MRI perfusion image data, T1-weighted (pre- and post-contrast) data, T2-weighted (pre- and post-contrast) data, or T2-weighted fluid-attenuated inversion recovery (T2-FLAIR) data.

9. The method according to claim 1, wherein the computer implemented quantitative pattern analysis further comprises analyzing and comparing a first region of interest (ROI) within the in vivo peritumoral edematous tissue which corresponds to a region of tissue adjacent an enhancing part of a tumor, and a second ROI which corresponds to a separate region of tissue within the in vivo peritumoral edematous tissue located at a location spaced farthest from the enhancing part of the tumor along a periphery of the in vivo peritumoral edematous tissue.

10. The method according to claim 9, wherein the computer-implemented performing step further comprises applying a multi-variance statistical procedure to the MRI data to determine perfusion temporal dynamics of the first and second ROIs.

11. The method according to claim 10, wherein the MRI data is dynamic susceptibility contrast material-enhanced magnetic resonance imaging (DSC-MRI).

12. The method according to claim 10, wherein said multi-variance statistical procedure is Principal Component Analysis (PCA).

13. The method according to claim 10, wherein said computer-implemented performing step further comprises measuring separability between the perfusion temporal dynamics determined for the first and second ROIs, and wherein said assigning step includes an assignment of EGFR-mutation positive status when the separability is low and an assignment of EGFR-mutation negative status when the separability is high.

14. The method according to claim 13, wherein the computer-implemented method further comprises calculating separability via Bhattacharyya coefficient analysis.

* * * * *

SEQUENCE LISTING

```
<160> NUMBER OF SEQ ID NOS: 1

<210> SEQ ID NO 1
<211> LENGTH: 1210
<212> TYPE: PRT
<213> ORGANISM: Homo sapiens
<220> FEATURE:
<221> NAME/KEY: SIGNAL
<222> LOCATION: (1)..(24)
<220> FEATURE:
<221> NAME/KEY: CHAIN
<222> LOCATION: (25)..(1210)

<400> SEQUENCE: 1

Met Arg Pro Ser Gly Thr Ala Gly Ala Ala Leu Leu Ala Leu Leu Ala
1               5                   10                  15

Ala Leu Cys Pro Ala Ser Arg Ala Leu Glu Glu Lys Lys Val Cys Gln
            20                  25                  30

Gly Thr Ser Asn Lys Leu Thr Gln Leu Gly Thr Phe Glu Asp His Phe
        35                  40                  45

Leu Ser Leu Gln Arg Met Phe Asn Asn Cys Glu Val Val Leu Gly Asn
```

```
                50              55              60
Leu Glu Ile Thr Tyr Val Gln Arg Asn Tyr Asp Leu Ser Phe Leu Lys
 65              70              75              80

Thr Ile Gln Glu Val Ala Gly Tyr Val Leu Ile Ala Leu Asn Thr Val
                 85              90              95

Glu Arg Ile Pro Leu Glu Asn Leu Gln Ile Ile Arg Gly Asn Met Tyr
                100             105             110

Tyr Glu Asn Ser Tyr Ala Leu Ala Val Leu Ser Asn Tyr Asp Ala Asn
                115             120             125

Lys Thr Gly Leu Lys Glu Leu Pro Met Arg Asn Leu Gln Glu Ile Leu
                130             135             140

His Gly Ala Val Arg Phe Ser Asn Asn Pro Ala Leu Cys Asn Val Glu
145             150             155             160

Ser Ile Gln Trp Arg Asp Ile Val Ser Ser Asp Phe Leu Ser Asn Met
                165             170             175

Ser Met Asp Phe Gln Asn His Leu Gly Ser Cys Gln Lys Cys Asp Pro
                180             185             190

Ser Cys Pro Asn Gly Ser Cys Trp Gly Ala Gly Glu Glu Asn Cys Gln
                195             200             205

Lys Leu Thr Lys Ile Ile Cys Ala Gln Gln Cys Ser Gly Arg Cys Arg
210             215             220

Gly Lys Ser Pro Ser Asp Cys Cys His Asn Gln Cys Ala Ala Gly Cys
225             230             235             240

Thr Gly Pro Arg Glu Ser Asp Cys Leu Val Cys Arg Lys Phe Arg Asp
                245             250             255

Glu Ala Thr Cys Lys Asp Thr Cys Pro Pro Leu Met Leu Tyr Asn Pro
                260             265             270

Thr Thr Tyr Gln Met Asp Val Asn Pro Glu Gly Lys Tyr Ser Phe Gly
                275             280             285

Ala Thr Cys Val Lys Lys Cys Pro Arg Asn Tyr Val Val Thr Asp His
                290             295             300

Gly Ser Cys Val Arg Ala Cys Gly Ala Asp Ser Tyr Glu Met Glu Glu
305             310             315             320

Asp Gly Val Arg Lys Cys Lys Lys Cys Glu Gly Pro Cys Arg Lys Val
                325             330             335

Cys Asn Gly Ile Gly Ile Gly Glu Phe Lys Asp Ser Leu Ser Ile Asn
                340             345             350

Ala Thr Asn Ile Lys His Phe Lys Asn Cys Thr Ser Ile Ser Gly Asp
                355             360             365

Leu His Ile Leu Pro Val Ala Phe Arg Gly Asp Ser Phe Thr His Thr
                370             375             380

Pro Pro Leu Asp Pro Gln Glu Leu Asp Ile Leu Lys Thr Val Lys Glu
385             390             395             400

Ile Thr Gly Phe Leu Leu Ile Gln Ala Trp Pro Glu Asn Arg Thr Asp
                405             410             415

Leu His Ala Phe Glu Asn Leu Glu Ile Ile Arg Gly Arg Thr Lys Gln
                420             425             430

His Gly Gln Phe Ser Leu Ala Val Val Ser Leu Asn Ile Thr Ser Leu
                435             440             445

Gly Leu Arg Ser Leu Lys Glu Ile Ser Asp Gly Asp Val Ile Ile Ser
450             455             460

Gly Asn Lys Asn Leu Cys Tyr Ala Asn Thr Ile Asn Trp Lys Lys Leu
465             470             475             480
```

```
Phe Gly Thr Ser Gly Gln Lys Thr Lys Ile Ile Ser Asn Arg Gly Glu
                485                 490                 495

Asn Ser Cys Lys Ala Thr Gly Gln Val Cys His Ala Leu Cys Ser Pro
            500                 505                 510

Glu Gly Cys Trp Gly Pro Glu Pro Arg Asp Cys Val Ser Cys Arg Asn
            515                 520                 525

Val Ser Arg Gly Arg Glu Cys Val Asp Lys Cys Asn Leu Leu Glu Gly
        530                 535                 540

Glu Pro Arg Glu Phe Val Glu Asn Ser Glu Cys Ile Gln Cys His Pro
545                 550                 555                 560

Glu Cys Leu Pro Gln Ala Met Asn Ile Thr Cys Thr Gly Arg Gly Pro
                565                 570                 575

Asp Asn Cys Ile Gln Cys Ala His Tyr Ile Asp Gly Pro His Cys Val
            580                 585                 590

Lys Thr Cys Pro Ala Gly Val Met Gly Glu Asn Asn Thr Leu Val Trp
        595                 600                 605

Lys Tyr Ala Asp Ala Gly His Val Cys His Leu Cys His Pro Asn Cys
        610                 615                 620

Thr Tyr Gly Cys Thr Gly Pro Gly Leu Glu Gly Cys Pro Thr Asn Gly
625                 630                 635                 640

Pro Lys Ile Pro Ser Ile Ala Thr Gly Met Val Gly Ala Leu Leu Leu
                645                 650                 655

Leu Leu Val Val Ala Leu Gly Ile Gly Leu Phe Met Arg Arg Arg His
                660                 665                 670

Ile Val Arg Lys Arg Thr Leu Arg Arg Leu Leu Gln Glu Arg Glu Leu
            675                 680                 685

Val Glu Pro Leu Thr Pro Ser Gly Glu Ala Pro Asn Gln Ala Leu Leu
        690                 695                 700

Arg Ile Leu Lys Glu Thr Glu Phe Lys Lys Ile Lys Val Leu Gly Ser
705                 710                 715                 720

Gly Ala Phe Gly Thr Val Tyr Lys Gly Leu Trp Ile Pro Glu Gly Glu
                725                 730                 735

Lys Val Lys Ile Pro Val Ala Ile Lys Glu Leu Arg Glu Ala Thr Ser
            740                 745                 750

Pro Lys Ala Asn Lys Glu Ile Leu Asp Glu Ala Tyr Val Met Ala Ser
        755                 760                 765

Val Asp Asn Pro His Val Cys Arg Leu Leu Gly Ile Cys Leu Thr Ser
    770                 775                 780

Thr Val Gln Leu Ile Thr Gln Leu Met Pro Phe Gly Cys Leu Leu Asp
785                 790                 795                 800

Tyr Val Arg Glu His Lys Asp Asn Ile Gly Ser Gln Tyr Leu Leu Asn
                805                 810                 815

Trp Cys Val Gln Ile Ala Lys Gly Met Asn Tyr Leu Glu Asp Arg Arg
            820                 825                 830

Leu Val His Arg Asp Leu Ala Ala Arg Asn Val Leu Val Lys Thr Pro
        835                 840                 845

Gln His Val Lys Ile Thr Asp Phe Gly Leu Ala Lys Leu Leu Gly Ala
    850                 855                 860

Glu Glu Lys Glu Tyr His Ala Glu Gly Gly Lys Val Pro Ile Lys Trp
865                 870                 875                 880

Met Ala Leu Glu Ser Ile Leu His Arg Ile Tyr Thr His Gln Ser Asp
                885                 890                 895
```

```
Val Trp Ser Tyr Gly Val Thr Val Trp Glu Leu Met Thr Phe Gly Ser
            900                 905                 910

Lys Pro Tyr Asp Gly Ile Pro Ala Ser Glu Ile Ser Ser Ile Leu Glu
        915                 920                 925

Lys Gly Glu Arg Leu Pro Gln Pro Pro Ile Cys Thr Ile Asp Val Tyr
        930                 935                 940

Met Ile Met Val Lys Cys Trp Met Ile Asp Ala Asp Ser Arg Pro Lys
945                 950                 955                 960

Phe Arg Glu Leu Ile Ile Glu Phe Ser Lys Met Ala Arg Asp Pro Gln
                965                 970                 975

Arg Tyr Leu Val Ile Gln Gly Asp Glu Arg Met His Leu Pro Ser Pro
            980                 985                 990

Thr Asp Ser Asn Phe Tyr Arg Ala  Leu Met Asp Glu Glu  Asp Met Asp
        995                 1000                1005

Asp Val  Val Asp Ala Asp Glu  Tyr Leu Ile Pro Gln  Gln Gly Phe
    1010                1015                1020

Phe Ser  Ser Pro Ser Thr  Ser  Arg Thr Pro Leu Leu  Ser Ser Leu
    1025                1030                1035

Ser Ala  Thr Ser Asn Asn Ser  Thr Val Ala Cys Ile  Asp Arg Asn
    1040                1045                1050

Gly Leu  Gln Ser Cys Pro Ile  Lys Glu Asp Ser Phe  Leu Gln Arg
    1055                1060                1065

Tyr Ser  Ser Asp Pro Thr Gly  Ala Leu Thr Glu Asp  Ser Ile Asp
    1070                1075                1080

Asp Thr  Phe Leu Pro Val Pro  Glu Tyr Ile Asn Gln  Ser Val Pro
    1085                1090                1095

Lys Arg  Pro Ala Gly Ser Val  Gln Asn Pro Val Tyr  His Asn Gln
    1100                1105                1110

Pro Leu  Asn Pro Ala Pro Ser  Arg Asp Pro His Tyr  Gln Asp Pro
    1115                1120                1125

His Ser  Thr Ala Val Gly Asn  Pro Glu Tyr Leu Asn  Thr Val Gln
    1130                1135                1140

Pro Thr  Cys Val Asn Ser Thr  Phe Asp Ser Pro Ala  His Trp Ala
    1145                1150                1155

Gln Lys  Gly Ser His Gln Ile  Ser Leu Asp Asn Pro  Asp Tyr Gln
    1160                1165                1170

Gln Asp  Phe Phe Pro Lys Glu  Ala Lys Pro Asn Gly  Ile Phe Lys
    1175                1180                1185

Gly Ser  Thr Ala Glu Asn Ala  Glu Tyr Leu Arg Val  Ala Pro Gln
    1190                1195                1200

Ser Ser  Glu Phe Ile Gly Ala
    1205                1210
```